United States Patent
Rahman et al.

(10) Patent No.: US 10,944,295 B2
(45) Date of Patent: Mar. 9, 2021

(54) TRANSMITTING APPARATUS FOR TRANSFERRING WIRELESS POWER AND CONTROLLING METHOD THEREOF

(71) Applicant: Samsung Electronics Co., Ltd, Gyeonggi-do (KR)

(72) Inventors: Muhammad Mahbubur Rahman, Dacca (BD); Mohammad Anwarul Hoque, Dacca (BD); Mohammad Tawhidul Islam Chowdhury, Dacca (BD); Faisal Khan, Dacca (BD); Kazy Fayeen Shariar, Dacca (BD); Sardar Muhammad Monzurur Rahman, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/908,702

(22) Filed: Feb. 28, 2018

(65) Prior Publication Data
US 2018/0254669 A1    Sep. 6, 2018

(30) Foreign Application Priority Data
Mar. 3, 2017    (KR) .................. 10-2017-0027587

(51) Int. Cl.
*H02J 7/00*    (2006.01)
*H02J 50/15*    (2016.01)
(Continued)

(52) U.S. Cl.
CPC .......... *H02J 50/15* (2016.02); *H02J 7/00036* (2020.01); *H02J 7/025* (2013.01); *H02J 50/40* (2016.02); *H02J 50/80* (2016.02); *H02J 7/00045* (2020.01)

(58) Field of Classification Search
CPC ....................................................... H02J 7/025
(Continued)

(56) References Cited

U.S. PATENT DOCUMENTS

| 2007/0109121 A1 | 5/2007 | Cohen |
| 2008/0265835 A1 | 10/2008 | Reed et al. |

(Continued)

FOREIGN PATENT DOCUMENTS

| EP | 2579421 A2 | 4/2013 |
| KR | 10-2007-0092435 A | 9/2007 |

(Continued)

OTHER PUBLICATIONS

ISA/KR, International Search Report and Written Opinion of the International Searching Authority for International Application No. PCT/KR2018/002047, dated Jun. 7, 2018, 13 pages.

(Continued)

*Primary Examiner* — Edward Tso
*Assistant Examiner* — Ahmed H Omar

(57) ABSTRACT

Disclosed herein is a wireless power transmitting apparatus using an ultrasonic wave. The transmitting apparatus includes a communication interface configured to perform wireless communication with at least one receiving apparatus, a transducer configured to generate an ultrasonic signal and transmit the generated ultrasonic signal to the at least one receiving apparatus, and a processor configured, in response to a charging request being received from the at least one receiving apparatus via the communication interface, to identify a charging priority and direction of the at least one receiving apparatus, and to control the transducer to generate the ultrasonic signal for charging power of the at least one receiving apparatus and transmit the generated ultrasonic signal to the at least one receiving apparatus based on the charging priority and the direction.

18 Claims, 16 Drawing Sheets

(51) Int. Cl.
*H02J 50/80* (2016.01)
*H02J 50/40* (2016.01)
*H02J 7/02* (2016.01)

(58) Field of Classification Search
USPC .......................................... 320/108
See application file for complete search history.

(56) References Cited

U.S. PATENT DOCUMENTS

| | | |
|---|---|---|
| 2010/0164433 A1 | 7/2010 | Janefalkar et al. |
| 2012/0155220 A1 | 6/2012 | Lee et al. |
| 2012/0303980 A1 | 11/2012 | Culbert et al. |
| 2013/0241308 A1 | 9/2013 | Bilbrey et al. |
| 2013/0271088 A1* | 10/2013 | Hwang ............... H02J 4/00 320/155 |
| 2013/0300356 A1 | 11/2013 | Yang |
| 2014/0002013 A1 | 1/2014 | Kossi et al. |
| 2015/0091498 A1* | 4/2015 | Abdelmoneum ....... H02J 7/025 320/107 |
| 2015/0333528 A1 | 11/2015 | Leabman |
| 2015/0380971 A1* | 12/2015 | Priev .................. H02J 50/40 320/108 |
| 2016/0099613 A1* | 4/2016 | Bell .................... H02J 7/025 307/104 |
| 2016/0100124 A1 | 4/2016 | Leabman et al. |
| 2016/0211705 A1 | 7/2016 | Moshfeghi |
| 2017/0201130 A1 | 7/2017 | Park |

FOREIGN PATENT DOCUMENTS

| | | |
|---|---|---|
| KR | 10-2012-0068581 A | 6/2012 |
| KR | 10-2014-0024565 A | 3/2014 |
| WO | 2015050777 A1 | 4/2015 |
| WO | 2015190858 A2 | 12/2015 |
| WO | 2016109316 A1 | 7/2016 |
| WO | 2017015506 A1 | 1/2017 |
| WO | 2017015519 A1 | 1/2017 |

OTHER PUBLICATIONS

European Patent Office, "Supplementary European Search Report," Application No. EP18760598.5, dated Nov. 11, 2019, 8 pages.

* cited by examiner

TRANSMITTING APPARATUS FOR TRANSFERRING WIRELESS POWER AND CONTROLLING METHOD THEREOF

CROSS-REFERENCE TO RELATED APPLICATION

This application is related to and claims priority to Korean Patent Application No. 10-2017-0027587 filed on Mar. 3, 2017, the disclosure of which is incorporated herein by reference in its entirety.

TECHNICAL FIELD

Apparatuses and methods consistent with exemplary embodiments relate to a transmitting apparatus for transmitting wireless power and a method of controlling the transmitting apparatus, and more particularly, to a multi-directional transmitting apparatus is capable of transmitting a wireless power to a plurality of receiving apparatuses by using ultrasonic waves, and a method of controlling the transmitting apparatus.

BACKGROUND

By using the electromagnetic induction based wireless charging method, it is possible to perform wireless charging in a near field transmission range, such as within about one meter. In addition, the radio frequency based wireless charging method has very little energy density and energy amount even after converting a radio frequency signal to energy. Accordingly, the radio frequency based wireless charging method has a problem because the energy efficiency is lowered.

Meanwhile, the ultrasonic wave based wireless charging method can solve problems of the electromagnetic induction based wireless charging method and the radio frequency based wireless charging method. Accordingly, a technique of maximizing the energy transmission efficiency from the ultrasonic wave generation apparatus is demanded.

SUMMARY

One or more example embodiments provide a multi directional transmitting apparatus that is capable of simultaneously charging a plurality of receiving apparatuses by using ultrasonic waves, and a method of controlling the transmitting apparatus.

To address the above-discussed deficiencies, it is a primary object to provide a transmitting apparatus comprising: a communication interface configured to perform wireless communication with at least one receiving apparatus; a transducer configured to generate an ultrasonic signal and transmit the generated ultrasonic signal to the at least one receiving apparatus; and a processor configured, in response to a charging request being received from the at least one receiving apparatus via the communication interface, to identify a charging priority and direction of the at least one receiving apparatus, and to control the transducer to generate the ultrasonic signal for charging a power of the at least one receiving apparatus and transmit the generated ultrasonic signal to the at least one receiving apparatus based on the charging priority and the direction.

According to an aspect of an example embodiment, there is provided a controlling method for power transmission of a transmitting apparatus, the method comprising: receiving a charging request from at least one receiving apparatus; identifying a charging priority and direction of the at least one receiving apparatus; and generating an ultrasonic signal for charging a power of the at least one receiving apparatus and transmitting the generated ultrasonic signal to the at least one receiving apparatus based on the charging priority and the direction.

According to the above-described embodiments, the transmitting apparatus and the control method thereof can provide a greater range of efficient charging area than the conventional short-range wireless charging method.

The transmitting apparatus and the control method thereof according to the example embodiments can reduce power consumption by controlling the transmission of ultrasonic signals according to the charging priority and direction of a plurality of receiving apparatuses.

The transmitting apparatus and the control method thereof according to the example embodiments can be implemented within a range of ultrasonic waves that are not harmful to the human body, and thus they are not harmful to the human body and animals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
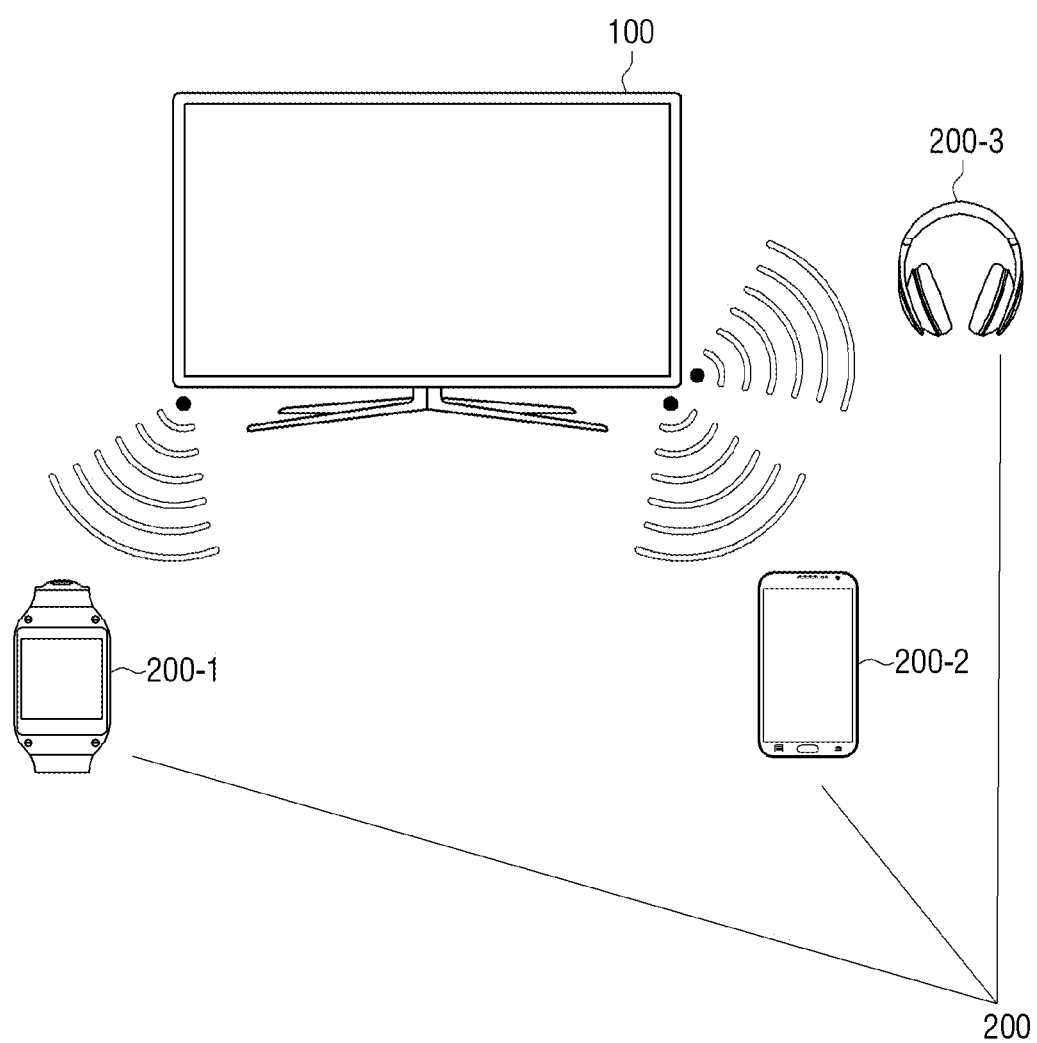
FIG. 1 is a diagram illustrating a system for charging a wireless power by using ultrasonic waves, according to an example embodiment.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The above and other aspects of the present disclosure will become more apparent by describing in detail exemplary embodiments thereof with reference to the accompanying drawings. However, exemplary embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

FIG. 1 is a diagram illustrating a system for charging a wireless power by using ultrasonic waves, according to an example embodiment of the present disclosure.

Referring to FIG. 1, a wireless power charging system 10 using ultrasonic waves may include a transmitting apparatus 100 for generating an ultrasonic wave and transmitting the generated ultrasonic wave and a receiving apparatus 200 for receiving an ultrasonic wave and charging.

For example, the transmitting apparatus 100 may be implemented by various types of electronic apparatuses such as a smart television, a laptop computer, a refrigerator, a washing machine, or the like. In addition, the transmitting apparatus 100 may be a compact ultrasonic wave wireless power providing apparatus which is mounted on a wall or a ceiling and supplies power. The receiving apparatus 200 may be implemented by various types of electronic apparatuses such as a smart phone, a tablet computer, a digital camera, a smart watch, a smart glass, or the like. In addition, the receiving apparatus 200 may be a charging apparatus, such as a portable adapter or the like, which is capable of supplying power to batteries of various electronic apparatuses.

The transmitting apparatus 100 may be provided with electronic energy from a power source, such as an electrical outlet, adapter, or the like. In addition, the transmitting apparatus 100 may be provided with electric energy from its own power source. The transmitting apparatus 100 may convert electric energy provided from a power source to an ultrasonic wave signal and simultaneously transmit the converted ultrasonic wave signal to a plurality of receiving apparatuses 200-1, 200-2 and 200-3. The transmitting apparatus 100 may generate an ultrasonic wave signal to correspond to a charge speed of the plurality of receiving apparatuses 200-1, 200-2 and 200-3 and transmit the generated ultrasonic wave signal toward the respective receiving apparatuses 200-1, 200-2 or 200-3. The converted ultrasonic wave signal may be used to charge each of the plurality of receiving apparatuses 200-1, 200-2 and 200-3.

The transmitting apparatus 100 may determine a charge priority of the plurality of receiving apparatuses 200-1, 200-2 and 200-3, and simultaneously transmit the ultrasonic wave signal to the plurality of receiving apparatuses 200-1, 200-2 and 200-3 according to the determined priority. In this regard, the transmitting apparatus 100 may transmit an ultrasonic wave to a receiving apparatus 200 which is positioned within a predetermined distance from the transmitting apparatus 100 from among the plurality of receiving apparatuses 200-1, 200-2 and 200-3. In addition, the transmitting apparatus 100 may simultaneously transmit an ultrasonic wave signal toward the respective receiving apparatuses 200-1, 200-2 and 200-3.

The receiving apparatus 200 may convert an ultrasonic wave signal received from a transmitting apparatus to electric energy. The receiving apparatus 200 may charge a battery, an adapter, or the like which is capable of supplying power to the receiving apparatus 200 by using the converted the electric energy.

The receiving apparatus 200 may transmit information relating to charging, such as charging state, charging history, charging speed, or the like of the receiving apparatus 200, to the transmitting apparatus 100 in real time. The transmitting apparatus 100 may identify a charge priority of the plurality of receiving apparatuses 200-1, 200-2 and 200-3 by using the information relating to charging received from the receiving apparatus 200.

An ultrasonic wave transferred from the transmitting apparatus 100 to the receiving apparatus 200 may be a line of sight (LOS) propagation which travels in a direct path. Accordingly, when an obstacle is present between the transmitting apparatus 100 and the receiving apparatus 200, the transmitting apparatus 100 may not transfer an ultrasonic wave signal to the receiving apparatus 200 to thereby reduce power loss of the transmitting apparatus 100.

The transmitting apparatus 100 and the receiving apparatus 200 may provide a charge status using ultrasonic waves and information related to charging to a user via various user interfaces in real time.

Figure 2:
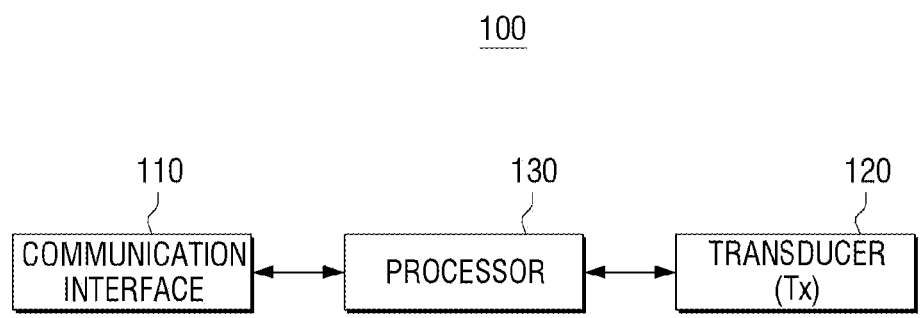
FIG. 2 illustrates a simplified block diagram of a transmitting apparatus, according to an example embodiment.

FIG. 2 illustrates a simplified block diagram of a transmitting apparatus, according to an example embodiment of the present disclosure.

Referring to FIG. 2, a transmitting apparatus 100 includes a communication interface 110, a transducer 120, and a processor 130.

The communication interface 110 may communicate with the plurality of receiving apparatuses 200-1, 200-2 and 200-3 via a wireless communication network. The communication interface 110 may receive a signal requesting charging from at least one of the plurality of receiving apparatuses 200-1, 200-2 and 200-3. Hereinafter, at least one of the receiving apparatuses 200-1, 200-2 and 200-3 may have the same meaning as the receiving apparatus 200 for convenience of explanation.

The communication interface 110 may receive, from the receiving apparatus 200, charging information related to charging of the receiving apparatus 200, such as the charging state and the charging rate of the receiving apparatus 200. For example, the charging state may include various charging-related situation information, such as a charging level of a battery that supplies power to the receiving apparatus 200, a charging on/off state of the receiving apparatus 200, a degree of battery consumption per hour of the receiving apparatus 200, a current charging progress of the receiving apparatus 200, and the like. The charging rate may be information included in a charging spec of the receiving apparatus 200 which is provided from the manufacturer at the time of manufacturing of the receiving apparatus 200. In addition, the charging rate may be ultrasonic wave frequency information calculated by the receiving apparatus 200 on the basis of the voltage and Ampere of the charger based on the current battery performance and requested by the transmitting apparatus 100. For example, the charging speed may be an ultrasonic wave frequency, such as 20,100 Hz, 30,100 Hz, or the like.

The transducer 120 may generate an ultrasonic wave by using an electric energy supplied from a power source (e.g., electric socket) of the transmitting apparatus 100. The transducer 120 may convert the generated ultrasonic wave into an ultrasonic wave signal (ultrasonic wave energy). In certain embodiments, the transducer 120 may be a transmission transducer (Tx) 120 for transmitting a converted ultrasonic wave signal to the receiving apparatus 200. An ultrasonic signal may be used to charge the receiving apparatus 200.

For example, the transducer 120 may convert an input voltage (alternating current (AC) or direct current (DC)) into an ultrasonic signal by using a piezoelectric element. Piezoelectric elements may be substances such as lead zirconate titannate (PZT), Barium titannate, Lead titanate (PbtiO3), Lithium niobate (LiNb03), Silicon dioxide (SiO2), Rochelle salt, or the like.

The transducer 120 may include a plurality of ultrasonic transducer arrays which are arranged in different positions. A plurality of ultrasonic transducers may generate ultrasonic signals of different frequencies, and each may include a motor. A plurality of ultrasonic transducer arrays each may transfer an ultrasonic signal toward a beam which is charged by a motor.

The processor 130 may, in response to a charge request being received from at least one receiving apparatus 200 via the communication interface 110, determine a charging priority and direction of the at least one receiving apparatus 200, and may control the transducer 120 to generate an ultrasonic signal for charging a power of the at least one receiving apparatus 200 to the at least one receiving apparatus 200 based on the determined charging priority and the determined direction and transmit the generated ultrasonic signal.

The processor 130 may identify a frequency with which the at least one receiving apparatus 200 is charged from the transmitting apparatus 100, and may identify a charging priority of the receiving apparatus based on the identified charging use frequency. The processor 130 may determine a charging priority of a receiving apparatus 200 having a high charging use frequency as a high level.

For example, the processor 130 may store in a memory (not illustrated) a charging use frequency of a receiving apparatus 200 having the history of charging through the transmitting apparatus 100. The processor 130 may update a charging use frequency of the receiving apparatus 200 every 24 hours, and may calculate a charging use frequency every week and store the calculated charge use frequency in a memory.

The processor 130 may identify a charging priority of at least one receiving apparatus 200 based on charging rate information and charging state information which are received from each of the at least one receiving apparatus 200 via the communication interface 110.

For example, the processor 130 may identify an estimated charging completion time at which a battery of the receiving apparatus 200 can be fully charged by using a charging state (e.g., battery level) and charging rate of the receiving apparatus 200. The processor 130 may determine a charging priority of a receiving apparatus 200 having a fast estimated charging completion time as a high level.

The processor 130 may identify the charging priority according to a charging priority by a user setting with respect to the at least one receiving apparatus 200.

For example, the transmitting apparatus 100 may receive a charging priority with respect to the plurality of receiving apparatuses 200-1, 200-2 and 200-3 from a user. The processor 130 may determine that a charging priority of a receiving apparatus 200-1, 200-2 or 200-3 by a user input as a high level.

The processor 130 may determine a charging priority of a receiving apparatus 200-1, 200-2 or 200-3 by a user input as a highest level by combining the methods of identifying a charging priority of the receiving apparatus 200-1, 200-2 or 200-3 described above. In addition, the processor 130 may determine a charging priority of a receiving apparatus 200-1, 200-2 or 200-3 having a high charging use frequency and a short estimated charging completion time as a high level.

The above-described example embodiments are merely exemplary, and the processor 130 may identify a charging priority of the receiving apparatus 200 through various methods so that the power efficiency of the transmitting apparatus 100 can be maximized.

In response to at least one receiving apparatus 200 requesting charging, the transmitting apparatus 100 may transfer an authentication request to the at least one receiving apparatus 200. In response to the receiving apparatus 200 accepting the authentication request of the transmitting apparatus 100, the processor 130 may identify a direction in which the at least one receiving apparatus 200 and a distance to the at least one receiving apparatus 200 by using a signal received from the at least one receiving apparatus 200 via the communication interface 110. The authentication stage may be performed once the transmitting apparatus 100 and the receiving apparatus 200 are connected for the first time.

The processor 130 may identify a distance between the transmitting apparatus 100 and the at least one receiving apparatus 200 by using a wireless signal transmitted and received via the communication interface 110. For example, the transmitted and received wireless signal may be a near field wireless signal, such as Bluetooth, Bluetooth Low Energy, or the like, but the example is not limited thereto. In addition, the processor 130 may identify a direction in which the receiving apparatus 200 is positioned by using a sound wave received from the receiving apparatus 200, but the example is not limited thereto.

The processor 130 may identify at least one ultrasonic transducer array which is capable of transmitting an ultrasonic frequency corresponding to each of the at least one receiving apparatus 200 based on a charging rate of the at least one receiving apparatus 200, and may control the transducer 120 to activate at least one ultrasonic transducer array.

The processor 130 may identify the number of at least one ultrasonic transducer array for charging each of the at least one receiving apparatus 200, and may control the transducer 120 to activate the number of ultrasonic transducer arrays whose distance from at least one of the plurality of ultrasonic transducer arrays to the receiving apparatus 200 is within a predetermined distance.

The processor 130 may control the transducer 120 to control a motor of at least one ultrasonic transducer array so that the at least one ultrasonic transducer array is directed to the at least one receiving apparatus 200.

The processor 130 may control the transducer 120 to activate the number of ultrasonic transducer arrays that are the shortest distance from the at least one receiving apparatus 200 and are not assigned to other receiving apparatus 200 toward the direction of the at least one receiving apparatus 200.

The processor 130 may identify whether there is an object that is an obstacle that obstructs the transmission of the ultrasonic signal on the LOS path to the receiving apparatus 200. In response to an object being present on the LOS path, the processor 130 may control the transducer 120 to stop transmitting an ultrasonic signal to the receiving apparatus 200. If a backscattered signal is available, the processor 130 may determine that an object is present on the LOS path.

The processor 130 may control a display (not illustrated) to display a user interface (UI) informing that the ultrasound signal transmission is stopped. If the ultrasound signal transmission is stopped, the processor 130 may request to change the position of the receiving apparatus 200, or may transmit a message informing that the ultrasonic signal transmission is stopped due to the object. Accordingly, the receiving apparatus 200 may display a notification message related to the object on the display.

In addition, the processor 130 may control the display to provide various UIs related to ultrasonic charging on the display.

Figure 3:
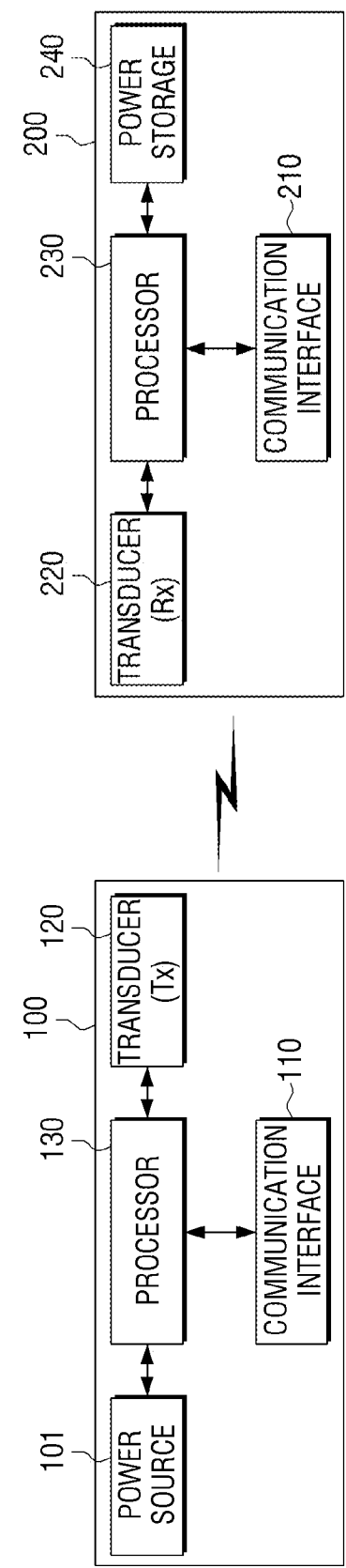
FIG. 3 illustrates a simplified block diagram of a system of charging a wireless power, according to an example embodiment.

FIG. 3 illustrates a simplified block diagram of a system of charging a wireless power, according to an example embodiment.

Referring to FIG. 3, a wireless power charging system 10 includes a transmitting apparatus 100 and a receiving apparatus 200. The transmitting apparatus 100 may include a power source 101, a communication interface 110, a transducer (Tx) 120, and a processor 130.

The transmitting apparatus 100 may transmit an ultrasonic wave, for example, between 20 kHz and 120 kHz through air. The transmitting apparatus 100 may transmit a high frequency sound to the receiving apparatus 200 as a sound is transmitted using a plurality of microphone arrays.

The power source 101 may supply electric energy to the transmitting apparatus 100. For example, the power source 101 may be an electrical outlet, a battery, an adapter, or the like. The transmitting apparatus 100 may receive electric energy from the power source 101. The electric energy received from the power source 101 may be generated as a signal by a signal generator (not illustrated). The generated signal may be generated as an amplified signal by an amplifier (not illustrated) and transmitted to the transducer (Tx) 120.

The communication interface 110, the transducer 120, and the processor 130 are explained in FIG. 2, and thus will not be further explained below for the sake of brevity.

The communication interface 110 may periodically broadcast a message and/or signal indicating that power transmission using ultrasound is possible in the air.

The transducer (Tx) 120 is an ultrasonic transducer which is capable of converting electric energy (amplified signal) supplied by the power source 101 into an ultrasonic signal. The ultrasonic transducer (Tx) 120 may convert electric energy to acoustic energy. The transducer (Tx) 120 may include a plurality of transducers which are arranged in an array capable of generating a multi directional ultrasonic signal (ultrasonic energy beam). The ultrasonic signal may be transmitted to the receiving apparatus 200 through a medium such as air.

In response to the transmitting apparatus 100 being present within a predetermined range, the processor 130 may control the transducer (Tx) 120 to transmit an ultrasonic signal to the transmitting apparatus 100. The predetermined range may be a range which can maximize the efficiency of energy transferred from the transmitting apparatus 100 to the receiving apparatus 200. For example, the predetermined range may be a distance within eight meters in which an object that obstructs the LOS path is not present between the transmitting apparatus 100 and the receiving apparatus 200, but is not limited thereto.

The transmitting apparatus 100 may include an antenna (not illustrated) for transmitting and receiving a signal for identifying a direction in which the receiving apparatus 200 is positioned and a signal for identifying a distance between the transmitting apparatus 100 and the receiving apparatus 200. The processor 130 may identify a distance and direction of the receiving apparatus 200 from the transmitting apparatus 100 by using a near field wireless signal received from the receiving apparatus 200 via the antenna and a sound wave received from the receiving apparatus 200 via a microphone.

The processor 130 may identify a position and distance of the receiving apparatus 200 by using a received signal strength indicator (RSSI) received from the receiving apparatus 200 via the communication interface 110 including wireless communication such as Bluetooth, Bluetooth Low Energy, near-field communication (NFC), Wi-Fi, or the like.

The receiving apparatus 200 may include a communication interface 210, a transducer (Rx) 220, a processor 230, and a power storage 240.

The receiving apparatus 200 may convert an ultrasonic wave signal received from a transmitting apparatus 100 to electric energy and charge the receiving apparatus 200.

The communication interface 210 may communicate with the transmitting apparatus 100 by using a near field wireless communication network, such as Bluetooth, Wi-Fi, NFC, and the like.

The communication interface 210 may receive a signal and/or message which is periodically broadcasted from the transmitting apparatus 100. The communication interface 210 may transmit a charging request signal and/or message to the transmitting apparatus 100.

The communication interface 210 may receive an authentication request from the transmitting apparatus 100 and transmit a response message regarding the authentication request to the transmitting apparatus 100.

The communication interface 210 may transmit various charging-related information, such as a charging rate, charging state, charging progress, the amount of electric power required for charging or the like, to the transmitting apparatus 100.

The transducer (Rx) 220 may convert an ultrasonic signal received from the transducer (Tx) 120 to an electric signal (electric energy) and charge the power storage 240.

In addition, the transducer (Rx) 220 may, or may not, include a motor (not illustrated) capable of changing a direction toward the transmitting apparatus 100.

The transducer (Rx) 220 may convert the received ultrasonic signal to an electric signal by using a piezoelectric element.

The receiving apparatus 200 may simultaneously receive an ultrasonic signal from a plurality of transducer arrays of the transducer (Tx) 120.

The processor 230 may convert each of a plurality of ultrasonic signals received from the transmitting apparatus 100 to an electric signal, and may control the transducer (Rx) 220 to combine the converted electric signals and charge the power storage 240.

The processor 230 may transmit a charging progress of the power storage 240 to the communication interface 110 of the transmitting apparatus 100 via the communication interface 210 in real time.

The processor 230 may control a display (not illustrated) of the receiving apparatus 200 to display various information associated with wireless charging using ultrasound waves through a UI.

In response to a motor being included in the transducer (Rx) 220, the processor 230 may determine a direction of the transducer (Tx) 120 and control the transducer (Rx) 220 to orient toward the direction determined by the transducer (Rx) 220.

The power storage 240 may be provided with electric energy from the transducer (Rx) 220. The power storage 240 may include a battery, a capacitive storage device, an electrostatic storage device, and the like, but is not limited thereto.

Figure 4:
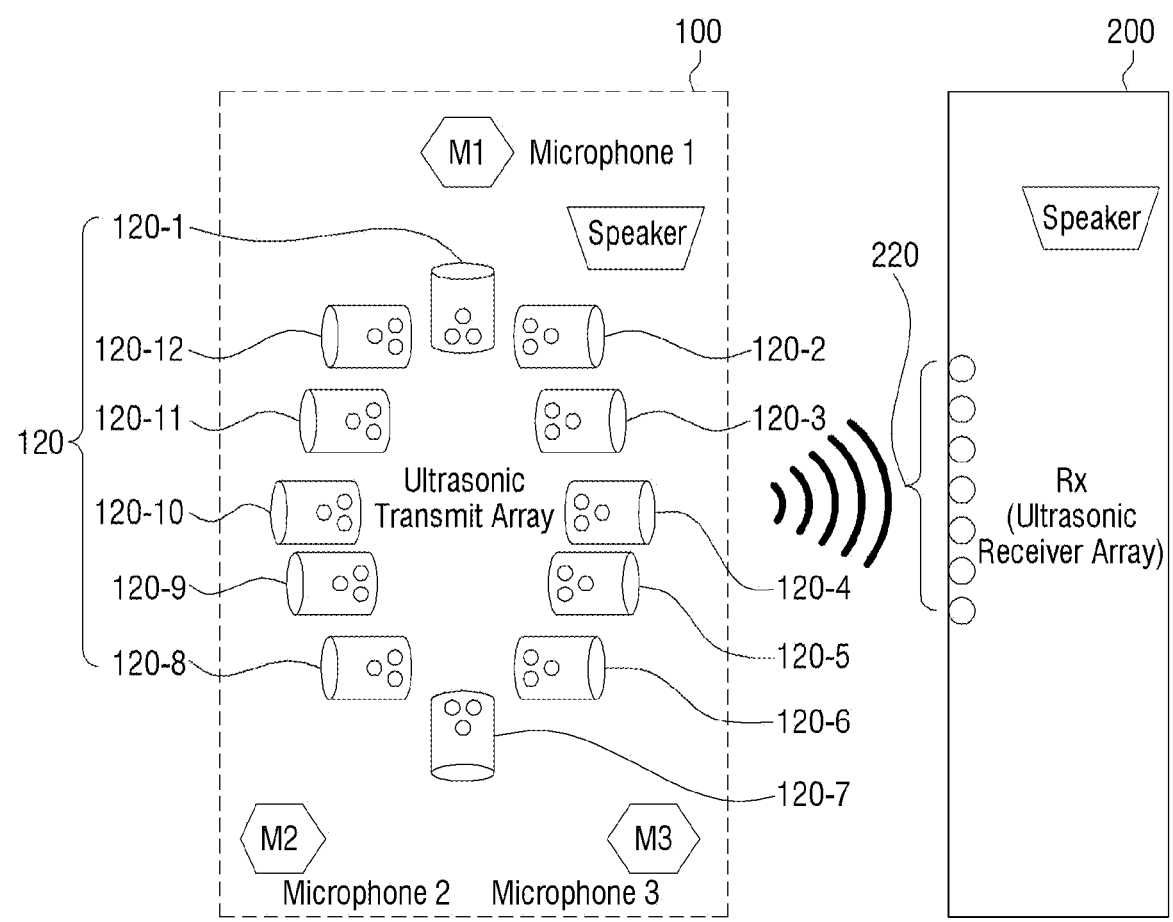
FIG. 4 is a diagram illustrating a transducer array of a transmitting apparatus and a receiving apparatus, according to an example embodiment.

FIG. 4 is a diagram illustrating a transducer array of a transmitting apparatus and a receiving apparatus, according to an example embodiment.

The transmitting apparatus 100 may include a transducer (Tx) 120 including a plurality of ultrasonic transducer arrays 120-1, 120-2, 120-3, 120-4, 120-5, 120-6, 120-7, 120-8, 120-9, 120-10, 120-11, and 120-12, a plurality of microphones M1, M2, and M3, and a speaker. An ultrasound signal may be focused in a particular direction of the transducer (Rx) 220 of the receiving apparatus 200 by using the plurality of ultrasonic transducer arrays 120-1, 120-2, 120-3, 120-4, 120-5, 120-6, 120-7, 120-8, 120-9, 120-10, 120-11, and 120-12. Accordingly, at least one of the plurality of ultrasonic transducer arrays 120-1, 120-2, 120-3, 120-4, 120-5, 120-6, 120-7, 120-8, 120-9, 120-10, 120-11, and 120-12 may transmit an ultrasonic signal toward a particular direction of at least one receiving apparatus 200.

After a position and distance of the receiving apparatus 200 are determined, the transmitting apparatus 100 may determine an ultrasonic transducer array to be activated from among the plurality of ultrasonic transducer arrays 120-1, 120-2, 120-3, 120-4, 120-5, 120-6, 120-7, 120-8, 120-9, 120-10, 120-11, and 120-12. In addition, the transmitting apparatus 100 may determine the number of ultrasonic transducer arrays to be activated, according to a charging state and charging rate of the receiving apparatus 200. The degree of propagation transmitted to the receiving apparatus 200 may be determined according to a frequency of each of the ultrasonic transducer arrays and the number of ultrasonic transducer arrays to be activated.

For example, the transmitting apparatus 100 may be an ultrasonic speaker including a plurality of ultrasonic transducer arrays 120-1, 120-2, 120-3, 120-4, 120-5, 120-6, 120-7, 120-8, 120-9, 120-10, 120-11, and 120-12. The transmitting apparatus 100 may activate an ultrasonic transducer array 120-3, 120-4, and 120-5 based on a distance and direction of the receiving apparatus 200. The receiving apparatus 200 may receive a frequency corresponding to the ultrasonic transducer array 120-3, 120-4, and 120-5 as an ultrasonic signal, and may convert the received ultrasonic signal to an electric signal and charge the receiving apparatus 200. In this regard, the ultrasonic transducer array 120-3, 120-4, and 120-5 may be controlled to orient toward a direction of the receiving apparatus 200. Meanwhile, the other ultrasonic transducer arrays 120-1, 120-2, 120-6, 120-7, 120-8, 120-9, 120-10, 120-11, and 120-12 may transmit a frequency corresponding to each of the ultrasonic transducer arrays toward a direction of the other receiving apparatuses.

Figure 5:
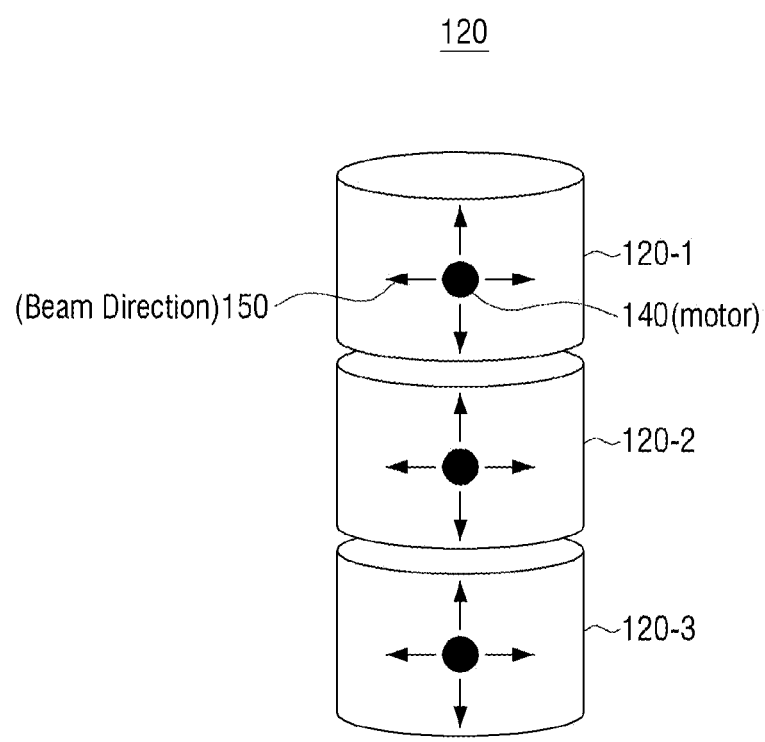
FIG. 5 is a diagram illustrating a transducer in which a direction is controlled by a motor, according to an example embodiment.

FIG. 5 is a diagram illustrating a transducer in which a direction is controlled by a motor, according to an example embodiment.

Referring to FIG. 5, a transducer (Tx) 120 may include three ultrasonic transducer arrays 120-1, 120-2, and 120-3. Each of the ultrasonic transducer arrays 120-1, 120-2, and 120-3 may include a motor 140 which is capable of controlling a direction of an ultrasonic transducer array. The ultrasonic transducer arrays 120-1, 120-2, and 120-3 may transmit an ultrasound signal toward an ultrasound beam direction which is changed by a motor 140. For example, the changed ultrasonic beam direction may be up, down, left, and right, but is not limited thereto.

Accordingly, the transducer (Tx) 120 may individually control a motor 140 of each of the ultrasonic transducer arrays 120-1, 120-2, and 120-3 to orient toward a direction of each of a plurality of receiving apparatuses 200.

Figure 6:
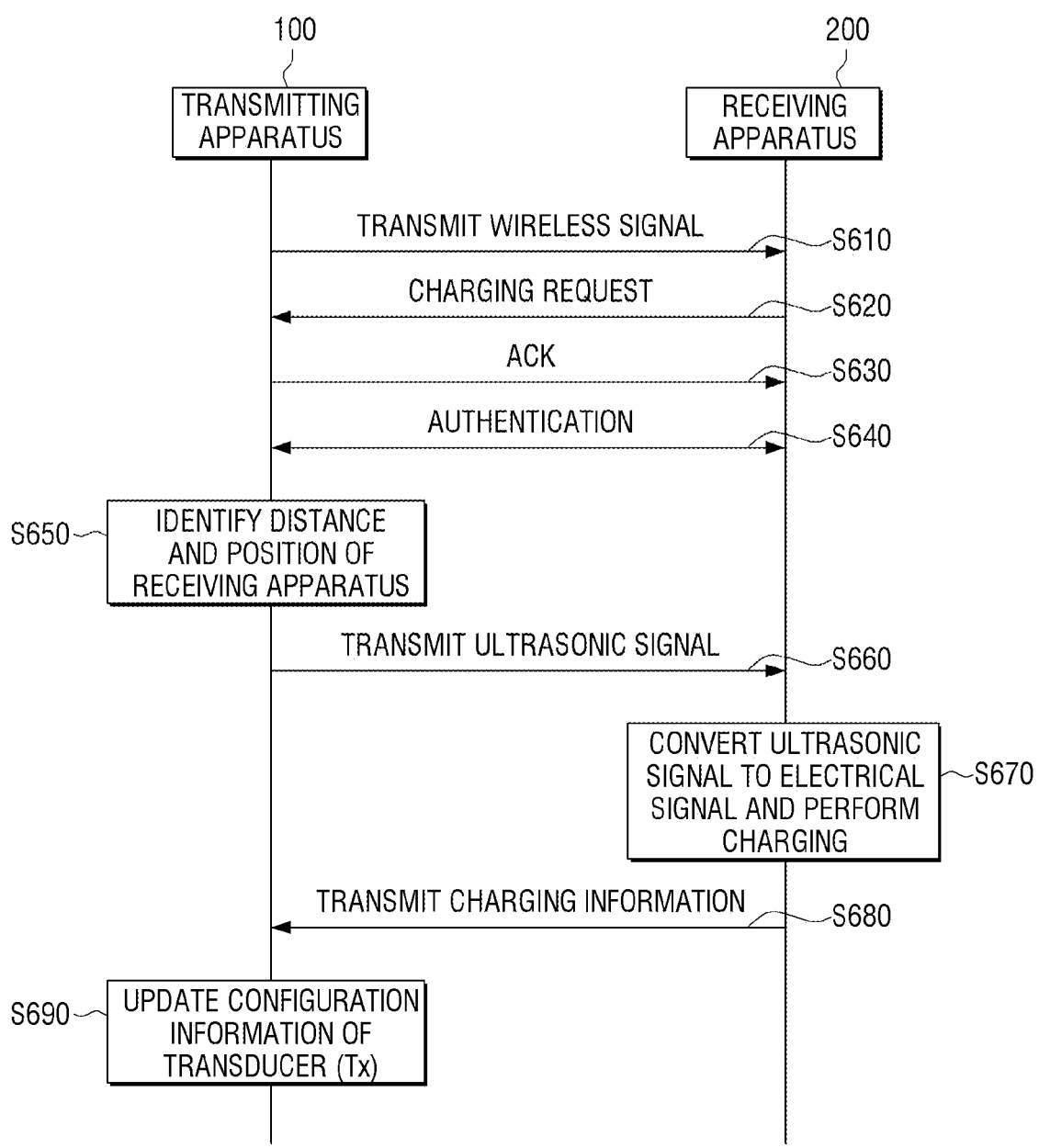
FIG. 6 illustrates a sequence diagram of charging a wireless power between a transmitting apparatus and a receiving apparatus, according to an example embodiment.

FIG. 6 is a sequence diagram illustrating charging a wireless power between a transmitting apparatus and a receiving apparatus, according to an example embodiment.

Referring to FIG. 6, at operation S610, a transmitting apparatus 100 may periodically transmit a wireless signal indicating that the transmitting apparatus 100 provides an ultrasonic wireless power to the receiving apparatus 200. For example, a wireless signal may be transmitted via a wireless network communication, such as a beacon signal, Wi-Fi signal, or the like. The receiving apparatus 200 may be a plurality of electronic apparatuses.

At operation S620, the receiving apparatus 200 may transmit a charging request signal to the transmitting apparatus 100.

At operation S630, the transmitting apparatus 100 may transmit an acknowledgment signal (ACK) in response to the charging request signal of the receiving apparatus.

At operation S640, the transmitting apparatus 100 may transmit a signal for authentication request to the receiving apparatus 200. The receiving apparatus 200 may transmit an authentication confirmation message to the transmitting apparatus 100 in response to the authentication request of the transmitting apparatus 100. For example, the authentication may be performed through a Bluetooth library, but is not limited thereto. In addition, the authentication may be a step for pairing the transmitting apparatus 100 and the receiving apparatus 200. The authentication may be performed when the transmitting apparatus 100 and the receiving apparatus 200 are connected for the first time.

At operation S650, the transmitting apparatus 100 may identify a distance and position of the receiving apparatus 200 that responds to the authentication request. The transmitting apparatus 100 may identify a position and distance of the receiving apparatus by using an RSSI received from the receiving apparatus 200. In addition, the transmitting apparatus 100 may identify a distance and position of the receiving apparatus through a distance measurement method using various wireless signals. In addition, the transmitting apparatus 100 may identify a distance and position of the receiving apparatus 200 through a sensor capable of detecting a position of the receiving apparatus 200. In addition, the transmitting apparatus 100 may also identify a distance of the receiving apparatus 200 from the transmitting apparatus 100 by using a sound wave or ultrasonic wave. A method of identifying a distance using a sound wave or ultrasonic wave will be described in detail later with reference to FIG. 10.

At operation S660, when a distance at which the receiving apparatus 200 is positioned is within a predetermined range from the transmitting apparatus 100, the transmitting apparatus 100 may transmit an ultrasonic signal to the receiving apparatus 200. The predetermined range may be a distance which is predetermined to minimize power loss when the transmitting apparatus 100 transmits an ultrasonic signal to the receiving apparatus 200. For example, the predetermined range may be within eight meters or within ten meters, but is not limited thereto. The predetermined range may be set at the time when the transmitting apparatus 100 is manufactured. In addition, the predetermined range may be automatically changed to an optimum range capable of minimizing power loss depending on the circumstances (for example, whether an obstacle is present or not, peripheral interference signal, etc.) in which the transmitting apparatus 100 transmits an ultrasonic signal.

At operation S670, the receiving apparatus 200 may charge the receiving apparatus 200 by converting an ultrasonic signal received from the transmitting apparatus 100 to an electrical signal.

At operation S680, the receiving apparatus 200 may transmit real time information relating to charging, such as a charging progress and the like, to the transmitting apparatus 100.

At operation S690, the transmitting apparatus 100 may update configuration information of a transducer (Tx) based on the real time information relating to charging received from the receiving apparatus 200. The configuration information of the transducer (Tx) may include information relating to an active state (active/inactive) of an ultrasonic transducer array, information relating to frequency characteristics of an activated ultrasonic transducer array, timing configuration (playback/recording) of an activated ultrasonic transducer array, a direction toward which an activated ultrasonic transducer array is orientated, information (for example, identification information of the receiving apparatus 200, etc.) relating to a receiving apparatus 200 that transmits an ultrasonic signal by targeting a activated ultrasonic transducer array, or the like. The transmitting apparatus 100 may identify ultrasonic transducer arrays to be assigned to other receiving apparatuses 200 to which a charging request signal is transmitted based on the updated configuration of information of the transducer (Tx).

Figure 7:
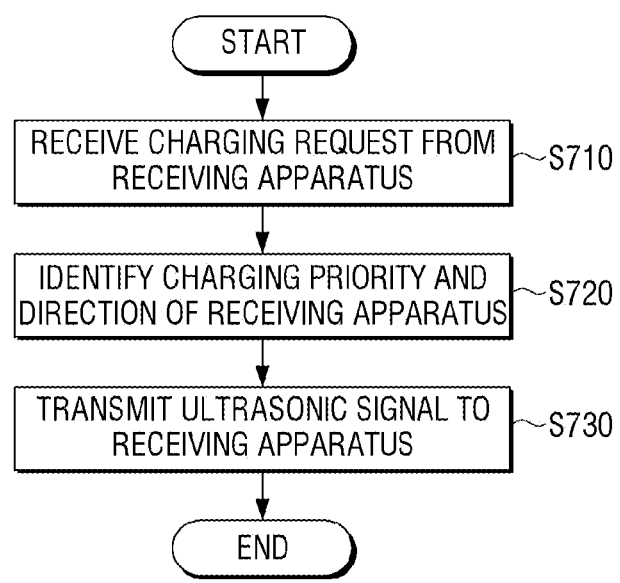
FIG. 7 illustrates a sequence diagram for the operation of a transmitting apparatus, according to an example embodiment.

FIG. 7 is a sequence diagram illustrating the operation of a transmitting apparatus, according to an example embodiment.

Referring to FIG. 7, at operation S710, the transmitting apparatus 100 may receive a charging request from the receiving apparatus 200.

At operation S720, the transmitting apparatus 100 may identify a charging priority and direction of the receiving apparatus 200. A method of identifying a charging priority will be described in detail later with reference to FIG. 8. A method of identifying a direction will be described with reference to FIG. 11.

At operation S730, the transmitting apparatus 100 may transmit an ultrasonic signal to the receiving apparatus 200 based on the identified charging priority of the receiving apparatus 200 and the identified direction of the receiving apparatus 200. In response to a charging request being received from a plurality of receiving apparatuses 200, the transmitting apparatus 100 may identify which receiving apparatuses 200 an ultrasonic signal is to be transmitted, according to a charging priority of each of the plurality of receiving apparatuses 200. The transmitting apparatus 100 may control an ultrasonic signal to be oriented toward a direction of each of the identified receiving apparatuses 200.

Figure 8:
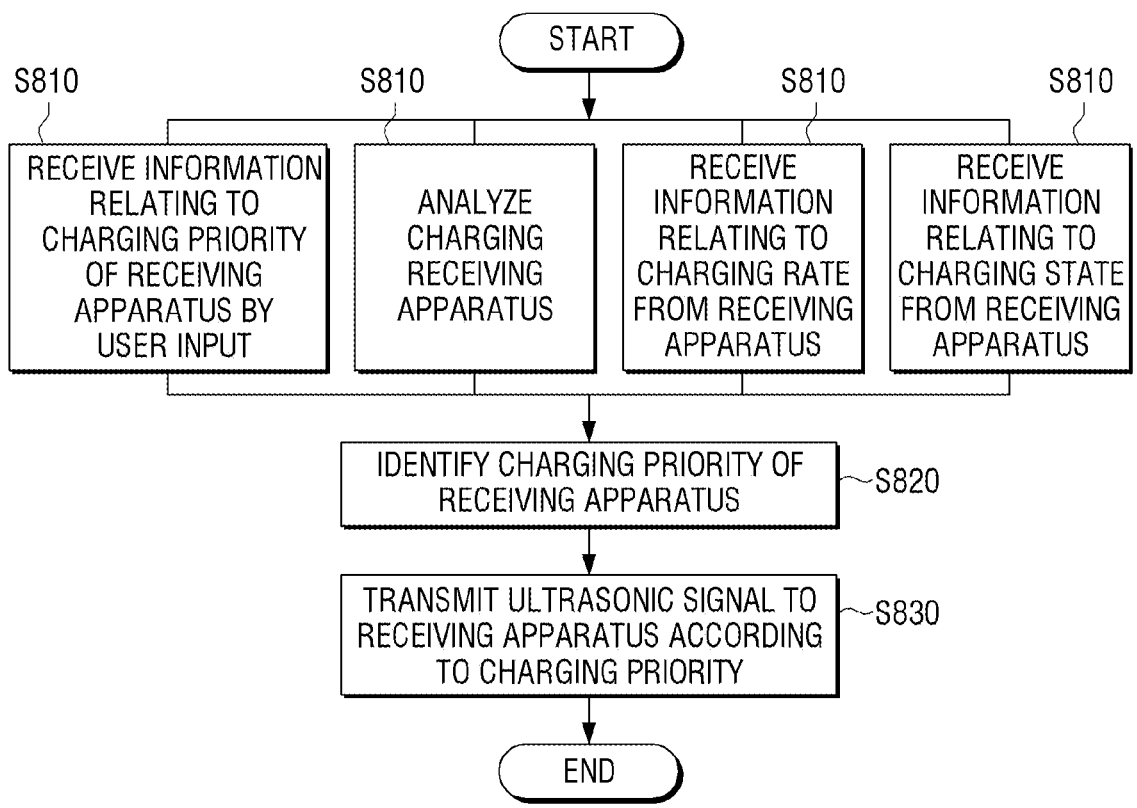
FIG. 8 illustrates a sequence diagram for a method of determining a charging priority of a receiving apparatus by a transmitting apparatus, according to an example embodiment.

FIG. 8 is a sequence diagram illustrating a method of determining a charging priority of a receiving apparatus by a transmitting apparatus, according to an example embodiment.

The transmitting apparatus 100 may receive information for identifying a charging priority of the receiving apparatus 200 before or after pairing (before or after the authentication stage) with the receiving apparatus 200.

Referring to FIG. 8, at operation S810, the transmitting apparatus 100 may receive information relating to a charging priority of the receiving apparatus 200 by a user input. For example, in response to a charging request being received from the receiving apparatus 200, a list of receiving apparatuses 200 that make a charging request on a display of the transmitting apparatus 100. The user may determine a charging priority of the receiving apparatus 200 based on the information of the receiving apparatus 200 displayed on the display. In addition, the transmitting apparatus 100 may preset and store charging specifications of the receiving apparatuses 200, which may be included in a higher level (or lower level) of a charging priority. In addition, the transmitting apparatus 100 may preset a charging priority of a particular receiving apparatus 200 to be included in a higher level (or lower level).

At operation S810, the transmitting apparatus 100 may analyze a charging frequency of the receiving apparatus 200 and store the analyzed charging frequency based on the number of times that the receiving apparatus 200 is charged through the transmitting apparatus 100 and the charging period in a memory. The transmitting apparatus 100 may determine a charging priority of a receiving apparatus 200 having a high charging period as a higher level. For example, the transmitting apparatus 100 may a charging priority of the receiving apparatus 200 having the largest number of times of charging through the transmitting apparatus 100 from 0 o'clock to 23:59:59 (for example, 24-hours basis) on a daily basis as the higher level. In addition, the transmitting apparatus 100 may analyze a charging period of the receiving apparatus 200 charged through the transmitting apparatus 100 on a weekly basis and store the analyzed charging period in a memory.

At operation S810, the transmitting apparatus 100 may receive information relating to a charging rate of the receiving apparatus 200 from the receiving apparatus 200. In response to a charging rate of the receiving apparatus 200 being within a frequency range of a transducer (Tx) that may be provided from the transmitting apparatus 100, the transmitting apparatus 100 may determine a charging priority of the receiving apparatus 200 as a higher level.

For example, a charging rate may be information included in charging specifications of the receiving apparatus 200 which is provided from a manufacturer at the time of the manufacture of the receiving apparatus 200. In addition, the charging rate may be ultrasonic wave frequency information calculated by the receiving apparatus 200 on the basis of the voltage and Ampere of the charger based on the current battery performance and requested by the transmitting apparatus 100. For example, the charging speed may be an ultrasonic wave frequency, such as 20,100 Hz, 30,100 Hz, or the like.

At operation S810, the transmitting apparatus 100 may receive information relating to a charging situation, such as charging state information and the like, from the receiving apparatus 200.

For example, the charging state may include various charging-related situation information, such as a charging level of a battery that supplies power to the receiving apparatus 200, a charging on/off state of the receiving apparatus 200, a degree of battery consumption per hour of the receiving apparatus 200, a current charging progress of the receiving apparatus 200, and the like.

At operation S820, the transmitting apparatus 100 may identify charging priorities of a plurality of receiving apparatuses 200 to optimize a power transmission efficiency of the transmitting apparatus 100 based on the information provided in the operation S810. The transmitting apparatus 100 may identify charging priorities of receiving apparatuses 200 by using an algorithm capable of optimizing a power transmission efficiency based on information stored in a memory. In this regard, the transmitting apparatus 100 may a charging priority of the receiving apparatus 200 which is set by a user as a top level.

At operation S830, the transmitting apparatus 100 may transmit an ultrasonic signal to each receiving apparatus 200 according to the identified charging priorities of the receiving apparatuses 200. For example, in response to a transducer (Tx) included in the transmitting apparatus 100 being capable of simultaneously charging a plurality of receiving apparatuses 200, the transmitting apparatus 100 may not consider the charging priorities of the plurality of receiving apparatuses 200. Meanwhile, in response to a propagation of a transducer (Tx) 120 included in the transmitting apparatus 100 being limited, the transmitting apparatus 100 may, based on the identified charging priorities of the plurality of receiving apparatuses 200, transmit an ultrasonic signal to a plurality of receiving apparatuses 200 according to the priorities.

Figure 9:
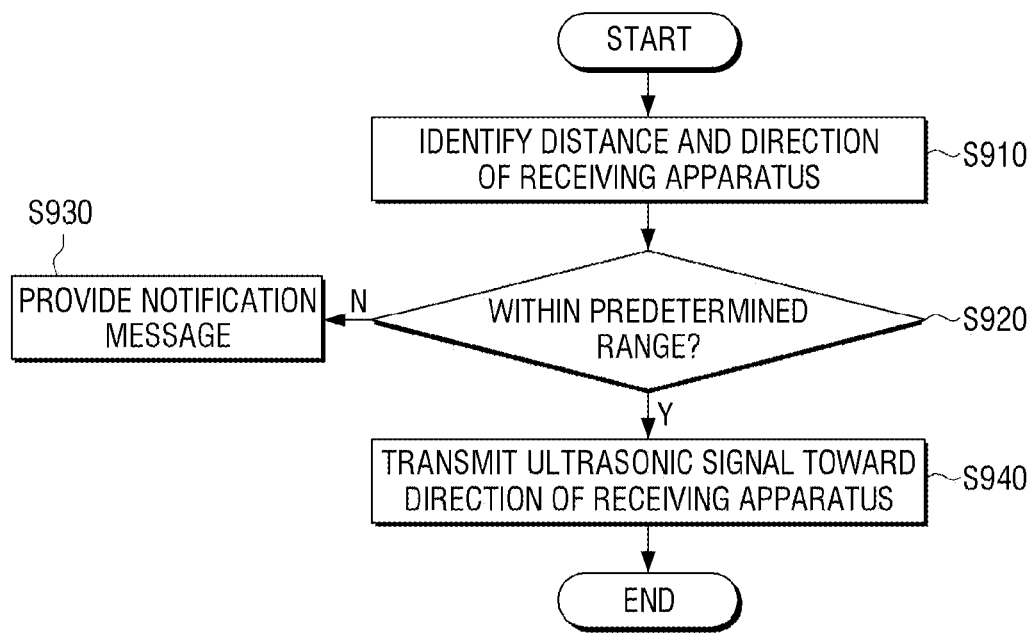
FIG. 9 illustrates a sequence diagram for a method of transmitting an ultrasonic wave according to a position of a receiving apparatus by a transmitting apparatus, according to an example embodiment.

FIG. 9 is a sequence diagram illustrating a method of transmitting an ultrasonic wave according to a position of a receiving apparatus by a transmitting apparatus, according to an example embodiment.

Referring to FIG. 9, at operation S910, the transmitting apparatus 100 may identify a distance and direction of the receiving apparatus 200.

In response to the receiving apparatus 200 not being positioned within a predetermined range from the transmitting apparatus 100 (S920: N), at operation S930, the transmitting apparatus 100 may display a notification message to stop transmitting an ultrasonic signal to the receiving apparatus 200 on a display of the transmitting apparatus 100. In addition, the transmitting apparatus 100 may transmit a signal for displaying a notification message on the display of the receiving apparatus 200 to the receiving apparatus 200 so that a position of the receiving apparatus 200 may be changed.

In response to the receiving apparatus 200 being positioned within a predetermined range from the transmitting apparatus 100 (S920: Y), at operation S940, the transmitting apparatus 100 may control such that an ultrasound signal is transmitted toward a direction of the receiving apparatus 200.

Figure 10:
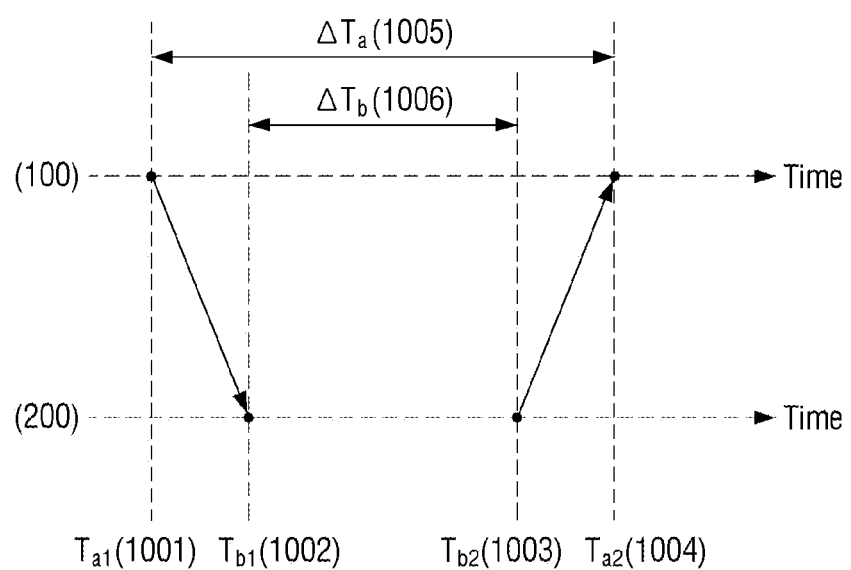
FIG. 10 is a diagram illustrating a method of identifying a distance to where a receiving apparatus is positioned by using ultrasonic waves or sound waves by a transmitting apparatus, according to an example embodiment.

FIG. 10 is a diagram illustrating a method of identifying a distance to where a receiving apparatus is positioned by using sound waves or ultrasonic waves by a transmitting apparatus, according to an example embodiment.

The electronic apparatuses that are capable to generate and listen to an ultrasonic resonance or sound wave may identify a distance between two electronic apparatuses. In general, a distance between two electronic apparatuses may be identified using a traveling time of an ultrasonic signal or sound wave from a source device to a target device. Accordingly, to accurately identify a distance between the transmitting apparatus 100 and the receiving apparatus 200, it is useful to know the traveling time of an ultrasonic signal or sound wave.

Referring to FIG. 10, an ultrasonic resonance or sound wave generated by the transmitting apparatus 100 at Ta1 1001 may be received by the receiving apparatus 200 at the traveling time Tb1 1002. Accordingly, the generated ultrasonic signal requires a time of Tb1 1002 to Ta1 1002 to reach from the transmitting apparatus 100 to the receiving apparatus 200. In addition, the ultrasonic signal or sound wave transmitted from the receiving apparatus 200 to the transmitting apparatus 100 at Tb2 1003 may be received by the transmitting apparatus 100 at Ta2 1004. Accordingly, the time taken for the ultrasonic signal or the sound wave to reach from the receiving apparatus 200 to the transmitting apparatus 100 may be Ta2 1004 to Tb2 1003.

For example, in response to identifying a distance between the transmitting apparatus 100 and the receiving apparatus 200 by using a sound wave, each of the transmitting apparatus 100 and the receiving apparatus 200 may include a speaker and/or microphone that is capable of generating and transceiving a sound wave.

Meanwhile, the transmitting apparatus 100 may identify a difference between the timestamps Ta1 1001 and Ta2 1004 from a time span ΔTa 1005 of the transmitting apparatus 100. The receiving apparatus 200 may identify a difference between the timestamps Tb1 1002 and Tb2 1003 from a time span ΔTb 1006 of the receiving apparatus 200.

Accordingly, the traveling time Tt1 of the ultrasonic wave or sound wave according to transmission/reception of the ultrasonic signal or sound wave between the transmitting apparatus 100 and the receiving apparatus 200 may be $$\frac{\Delta Ta(1005) - \Delta Tb(1006)}{2}.$$

The traveling distance (Δs) of the ultrasonic signal or the sound wave may be obtained using the equation (Δs=V*t) which is the speed (v) times the traveling time (t). Since the sound velocity (v) is approximately 340 m/s, the traveling distance (Δs) of the ultrasonic wave or the sound wave is expressed by Equation (1).

$$\Delta s = 340 * \frac{\Delta Ta(1005) - \Delta Tb(1006)}{2} \quad \text{[Equation 1]}$$

In the above example embodiment, a method of identifying a distance using an ultrasonic signal or a sound wave is described. However, in example embodiments, a distance of the receiving apparatus 200 may be identified using various near field wireless signals and sensors.

Figure 11:
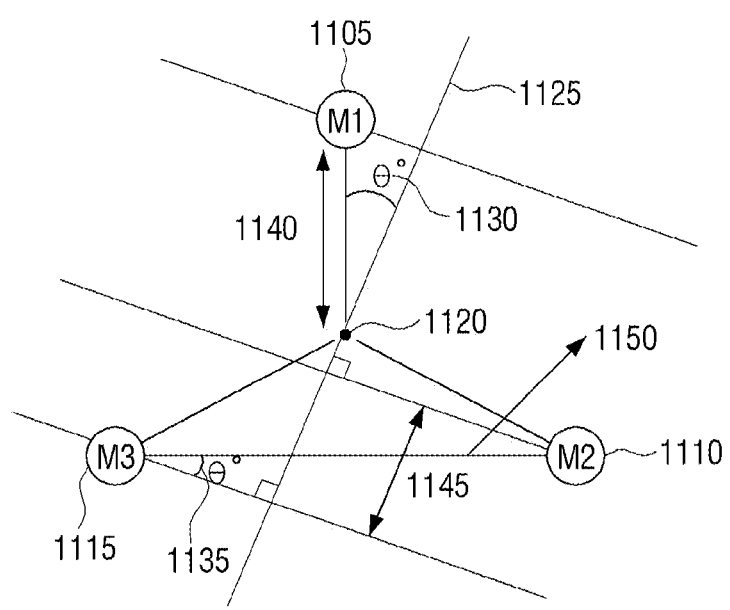
FIG. 11 is a diagram illustrating a method of identifying a direction in which a receiving apparatus is positioned by using ultrasonic waves by a transmitting apparatus, according to an example embodiment.

FIG. 11 is a diagram illustrating a method of identifying a direction in which a receiving apparatus is positioned by using a plurality of microphone arrays by a transmitting apparatus, according to an example embodiment.

The transmitting apparatus 100 may include a directional antenna which is capable of receiving a signal from a plurality of receiving apparatuses 200 and transmitting a signal toward a particular direction. The receiving apparatus 200 may, or may not, include a directional antenna. The transmitting apparatus 100 may identify a direction of a sound source of the receiving apparatus 200 received through the directional antenna by using a plurality of microphone arrays.

Referring to FIG. 11, the transmitting apparatus 100 may include a plurality of microphones 1105, 1110, and 1115. The plurality of microphones 1105, 1110, and 1115 may identify a direction of a sound source based on an angle (θ) 1130 with respect to a sound source positioned at a particular point on a three-dimensional space by using a vertical line 1125.

For example, in response to a distance to the sound source is closest to a microphone 1 (M1) 1105, a sound wave reaches the microphone 1 (M1) 1105 first, and the sound wave may arrive late at a microphone 2 (M2) 1110 and a microphone 3 (M3) 1115 by an arrival delay time (t). That is, a time taken for a sound wave to reach the microphone 2 (M2) 1110 may require a time difference of arrival (TDOA), which is an extra time, in addition to a time taken for the sound wave to travel to the microphone 1 (M1) 1105. Accordingly, the transmitting apparatus 100 may identify a direction of the receiving apparatus 200 by using an arrival delay time of the sound wave based on the TDOA.

The plurality of microphones 1105, 1110, and 1115 may be arranged at a distance (L) 1140 from the center 1120 of a microphone array. For example, a distance 1150 between the microphone 2 (M2) 1110 and the microphone 3 (M3) 1115 may be (y). In this regard, a vertical distance (d) 1145 between two sound wave incident planes may be y*sin θ. In this regard, θ 1135 may be identical to an angle of incident θ 1130.

Accordingly, the difference between a sound wave propagation distance from the receiving apparatus 200 to the microphone 2 (M2) 1110 and a sound wave propagation distance from the receiving apparatus 200 to the microphone 3 (M3) 1115 may be expressed as Equation 2. Accordingly, the angle of incident θ 1130 may be expressed as Equation 3. The arrival delay time (t) may be expressed as Equation 4.

$$d = t*v = y*\sin\theta \qquad \text{[Equation 2]}$$

$$\theta = \arcsin\frac{d}{y} \qquad \text{[Equation 3]}$$

$$t = \frac{d}{y} \qquad \text{[Equation 4]}$$

Accordingly, a direction of a sound source may be identified by calculating the arrival delay time (t) from the Equation 1. The arrival delay time (t) may be identified by analyzing a signal input to each of the plurality of microphones 1105, 1110, and 1115. For example, the arrival delay time (t) between the microphone 2 (M2) 1110 and the microphone 3 (M3) 1115 may be a difference between a signal arrival time (t1) input to the microphone 2 (M2) 1110 and the signal arrival time (t2) input to the microphone 3 (M3) 1115. In this regard, the arrival delay time (t) may reflect elements such as a temperature, interference signal, an obstacle, or the like.

In the above example embodiment, a method of identifying a direction in which the receiving apparatus 200 is positioned by using a difference between arrival times of sound sources using a plurality of microphone arrays. However, in example embodiments, a direction in which the receiving apparatus 200 is positioned may be identified using various near field wireless signals. In addition, in the above example embodiment, a method of identifying a direction of a sound source by using a TDOA method. However, in example embodiments, methods such as beam former application technique (steered response power (SRP)), probability and statistic method (maximum likelihood (ML)), or the like, may be used as well.

Figure 12:
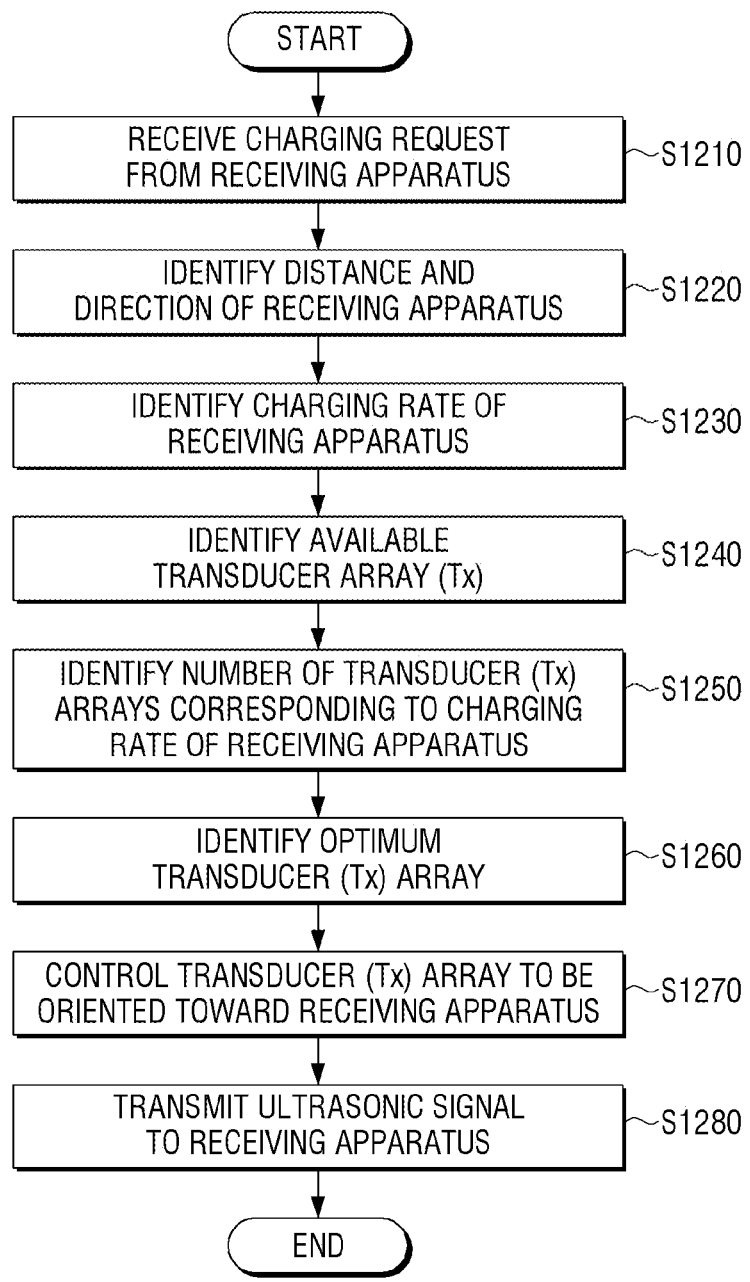
FIG. 12 is a flowchart illustrating a method of identifying an optimum transducer array by a transmitting apparatus, according to an example embodiment.

FIG. 12 is a flowchart illustrating a method of identifying an optimum transducer by a transmitting apparatus, according to an example embodiment.

Referring to FIG. 12, at operation S1210, the transmitting apparatus 100 may receive a charging request from the receiving apparatus 200. The receiving apparatus 200 may transmit charging state information of the receiving apparatus, identification information of the receiving apparatus 200, or the like, to the transmitting apparatus 100 together. The transmitting apparatus 100 may identify a charging priority of the receiving apparatus based on information received from the receiving apparatus 200.

At operation S1220, the transmitting apparatus 100 may identify a distance and direction of the receiving apparatus 200. In response to the receiving apparatus 200 accepting an authentication request of the receiving apparatus 100, the transmitting apparatus 100 may identify a direction in which the receiving apparatus 200 is positioned and a distance between the transmitting apparatus 100 and the receiving apparatus 200. A method of identifying a distance and direction of the receiving apparatus 200 is described above and thus, specific description will not be provided.

At operation S1230, the transmitting apparatus 100 may identify a charging rate of the receiving apparatus 200. The receiving apparatus 200 may receive a charging rate of the receiving apparatus 200 at operation S1210, or may receive it at the authentication stage of operation S1220.

For example, the charging rate may be wattage per hour that is requested from the receiving apparatus 200 to the transmitting apparatus 100. The charging rate may be based on charging specifications stored when the receiving apparatus 200 is manufactured. In addition, the charging rate may be calculated by the transmitting apparatus 100 by using at least one of a wattage per hour requested by the receiving apparatus 200 or pre-stored charging specifications based on a charging priority of the receiving apparatus 200.

At operation S1240, the transmitting apparatus 100 may identify an available transducer array from among a plurality of transducer (Tx) arrays included in a transducer (Tx), for example transducer (Tx) 120.

The transmitting apparatus 100 may identify at least one ultrasonic transducer array which is capable of transmitting an ultrasonic frequency corresponding to each of the at least one receiving apparatus 200 based on a charging rate of the at least one receiving apparatus 200, and may control the transducer (Tx) 120 to activate at least one ultrasonic transducer array.

The plurality of transducer arrays may generate ultrasonic signals each having different frequencies and transmit the generated ultrasonic signals to a receiving apparatus 200 corresponding to each frequency. The plurality of transducer arrays may transmit a frequency toward the receiving apparatuses 200 each positioned in different directions. The transmitting apparatus 100 may identify that a transducer (Tx) 120 corresponding to a charging rate of the receiving apparatus 200 is available. The transmitting apparatus 100 may identify that a transducer array not currently activated from among a plurality of transducer arrays is available.

In response to identifying that there is no transducer array that is available, the transmitting apparatus 100 may transmit a signal for notifying that charging is not available on a display of the receiving apparatus 200. The transmitting apparatus 100 may display that there is no transducer array that is available on a display of the transmitting apparatus 100 as well.

At operation S1250, the transmitting apparatus 100 may identify the number of transducer arrays corresponding to a charging rate of the receiving apparatus 200.

The transmitting apparatus 100 may identify the number of at least one ultrasonic transducer array for charging each of the at least one receiving apparatus 200, and may control the transducer (Tx) 120 to activate the number of ultrasonic transducer arrays whose distance from at least one of the plurality of ultrasonic transducer arrays to the receiving apparatus 200 is within a predetermined distance. The transmitting apparatus 100 may identify the number of transducer arrays corresponding to a charging rate of the receiving apparatus 200 from among the plurality of available transducer arrays.

For example, the transmitting apparatus 100 may identify the number of transducer arrays that can satisfy the charging rate of the receiving apparatus 200 from among a plurality of transducer arrays A, B, and C that are not currently activated. In response to the sum of a frequency of a transducer array A and a frequency of a transducer array B satisfying a charging rate of the receiving apparatus 200, the transmitting apparatus 100 may identify that the number of transducer array A and transducer array B (two) as the number of transducer arrays corresponding to the charging rate of the receiving apparatus 200. In addition, in response to a frequency of a transducer array C satisfying a charging rate of the receiving apparatus 200, the transmitting apparatus 100 may identify the number of the transducer array C, which is one, as the number of transducer arrays corresponding to the charging rate of the receiving apparatus 200.

At operation S1260, the transmitting apparatus 100 may identify an optimum transducer array from among the identified number of transducer arrays.

For example, the transmitting apparatus 100 may identify an optimum transducer array based on a distance between each of the transducer arrays A, B, and C and a direction in which the receiving apparatus 200 is positioned. The transmitting apparatus 100 may identify a transducer (Tx) 120 which is at a closest distance from the receiving apparatus 200 as an optimum transducer array. In addition, when an angle of a transducer array from among a plurality of arrays is controlled to orient toward a direction in which the receiving apparatus 200 is positioned, the transmitting apparatus 100 may identify a transducer array having the smallest control angle of the transducer array as an optimum transducer array. In addition, the transmitting apparatus 100 may identify a transducer array capable of maximizing the power efficiency of the transmitting apparatus 100 from among the identified number of transducer arrays as an optimum transducer array.

At operation S1270, the transmitting apparatus 100 may control such that the determined optimum transducer array is oriented toward the receiving apparatus 200.

The transmitting apparatus 100 may activate the determined optimum transducer array. The transmitting apparatus 100 may control a motor of at least one ultrasonic transducer array so that the at least one ultrasonic transducer array is directed to the at least one receiving apparatus 200.

At operation S1280, the transmitting apparatus 100 may generate an ultrasonic signal through the activated optimum transducer array and transmit the generated ultrasonic signal to the receiving apparatus 200.

Figure 13:
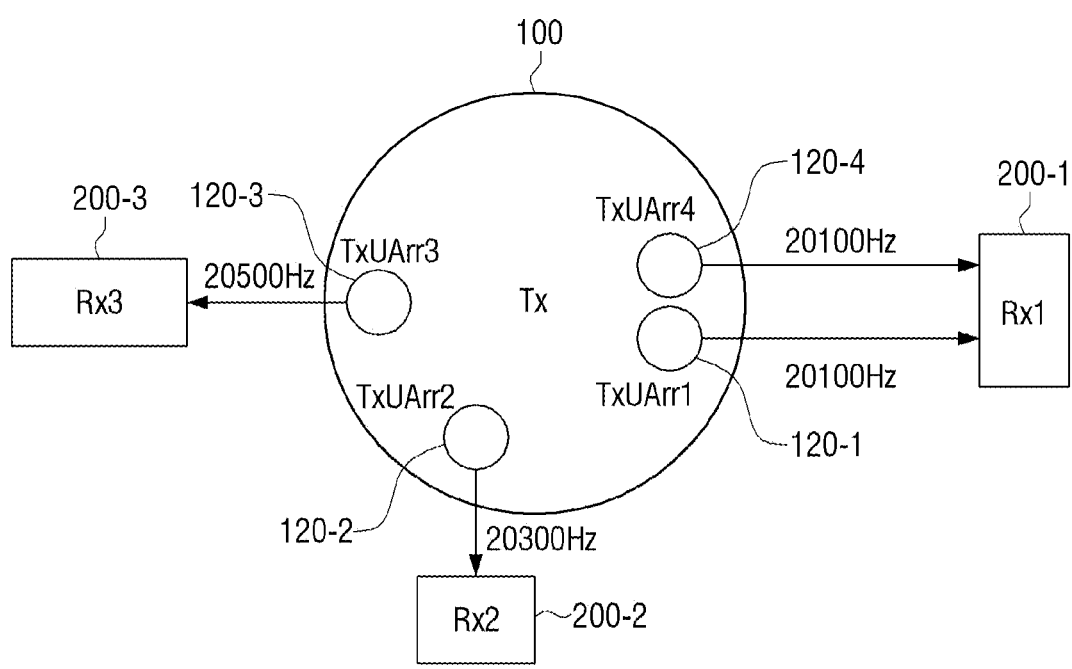
FIG. 13 is a flowchart illustrating a method of charging a plurality of receiving apparatuses by using a multi-directional transducer array by a transmitting apparatus, according to an example embodiment.

FIG. 13 is a flowchart illustrating a method of charging a plurality of receiving apparatuses by using a multi directional transducer array by a transmitting apparatus, according to an example embodiment.

Referring to FIG. 13, the transmitting apparatus 100 may include a transducer (Tx), for example transducer (Tx) 120, including a plurality of transducer arrays 120-1, 120-2, 120-3, and 120-4. The plurality of transducer arrays 120-1, 120-2, 120-3, and 120-4 may generate ultrasonic signals that are different from each other, and may each transmit the generated signal to the plurality of receiving apparatuses 200-1, 200-2, and 200-3. The plurality of transducer arrays 120-1, 120-2, 120-3, and 120-4 may identify receiving apparatuses 200-1, 200-2, and 200-3 corresponding to the plurality of transducer arrays 120-1, 120-2, 120-3, and 120-4 based on charging rates of the receiving apparatuses 200-1, 200-2, and 200-3.

For example, there may be three receiving apparatuses 200-1, 200-2, and 200-3 that request charging to the transmitting apparatus 100 and accept an authentication request of the transmitting apparatus 100. As illustrated in FIG. 11, the transmitting apparatus 100 may identify an optimum transducer array to be activated based on a distance and direction of the receiving apparatus 200. In addition, the transmitting apparatus 100 may identify an optimum transducer array to be activated based on the charging rate of the receiving apparatus 200.

A plurality of transducer arrays 120-1, 120-2, and 120-3 corresponding to each of the plurality of receiving apparatuses 200-1, 200-2, and 200-3 may be activated. For example, a first transducer array 120-1 and a fourth transducer array 120-4 may each generate and transmit an ultrasonic signal of 20100 Hz, and the second transducer array 120-2 may generate and transmit an ultrasonic signal of 20300 Hz, and the third transducer array 120-3 may generate and transmit an ultrasonic signal of 20500 Hz.

In this regard, the transmitting apparatus 100 may identify that a first receiving apparatus 200-1 is in need of an extra charging rate based on a charging rate of a first receiving apparatus 200-1. The transmitting apparatus 100 may activate a fourth transducer 120-4 which is not to be currently activated and assign the fourth transducer 120-4 to the first receiving apparatus 200-1. Since the first receiving apparatus 200-1 is being charged at a frequency of 20,100 Hz through the first transducer array 120-1, the transmitting apparatus 100 may control the fourth transducer 120-4 to generate a frequency of 20,100 Hz and transmit the frequency to the first receiving apparatus 200-1. The first receiving apparatus 200-1 may be charged at a frequency of 20,100 Hz using an ultrasonic signal generated from the first transducer 120-1 and the fourth transducer 120-4. Accordingly, the transmitting apparatus 100 may transmit an ultrasonic signal to three receiving apparatuses 200-1, 200-2, and 200-3, simultaneously.

That is, when an ultrasonic signal is transmitted using a plurality of transducer arrays 120-1, 120-2, and 120-3, an intensity of ultrasonic signal reaching the receiving apparatus 200 may be increased to quickly charge the receiving apparatus 200. The signal intensity may be a voltage intensity or a current intensity.

Figure 14:
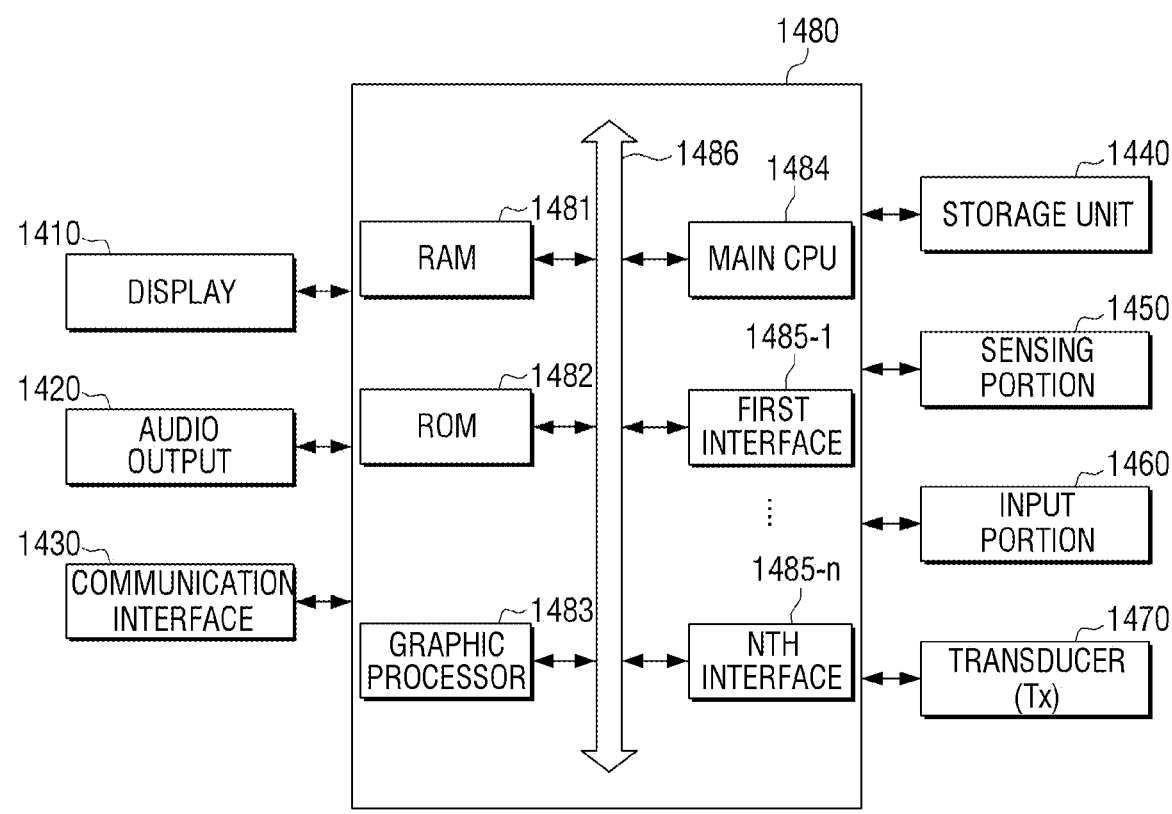
FIG. 14 illustrates a detailed block diagram of a transmitting apparatus, according to an example embodiment.

FIG. 14 is a detailed block diagram illustrating a transmitting apparatus, according to an example embodiment. At least one of the components of the transmitting apparatus 100 may be an element of the receiving apparatus 200. In addition, some elements illustrated in FIG. 14 may be removed or modified, or other new elements may be further added.

The display 1410 may display at least one of a video frame where image data received from the image receiving apparatus (not illustrated) and processed by the image processor (not illustrated), and various screens generated by the graphic processor 1483. In particular, the display 1410 may display information relating to charging, such as charging state information of the receiving apparatus received through the communication interface 1430 and the like.

The audio output 1420 may include various audio output circuitry and is configured to output various kinds of alarm sounds or voice messages in addition to various audio data on which various processing operations such as decoding, amplification, and noise filtering are performed by an audio processor (not illustrated). In particular, the audio output 1420 may be implemented as any output terminal capable of outputting audio data.

The communication interface 1430 is configured to communicate with various kinds of external devices in various communication methods. The communication interface 1430 may include at least one of a WiFi chip, a Bluetooth® chip, an NFC chip, or a wireless communication chip. Herein, the WiFi chip, the Bluetooth® chip and the NFC chip respectively perform communication according to WiFi method, Bluetooth® method, and NFC method. The NFC chip refers to a chip which operates in a near field communication (NFC) method using 13.56 MHz band among various RF-ID frequency bands such as 135 kHz, 13.56 MHz, 433 MHz, 860-960 MHz, 2.45 GHz, and the like. When the WI-FI chip or the Bluetooth chip is used, various connection information such as SSID and session keys may be first exchanged, communication may be connected by using the connection information, and various information may be exchanged. The wireless communication chip represents a chip which communicates according to various communication standards such as IEEE, Zigbee, 3rd Generation (3G), 3rd Generation Partnership Project (3GPP), Long Term Evolution (LTE) and so on.

In addition, the communication interface 1430 may communicate with the receiving apparatus 200 for wireless charging of the receiving apparatus 200 as in the descriptions of FIGS. 2 and 3.

The storage unit 1440 may store various types of program modules for driving the transmitting apparatus 100. In addition, the storage unit 1440 may store the charging history of the receiving apparatus 200 charged through the transmitting apparatus 100, information relating to the charging of the receiving apparatus 200, and the like. The storage unit 1440 may store a charging priority of the receiving apparatus 200.

For example, the storage unit 1440 may further include a position determining module for determining a global positioning system (GPS)-based position, and the sensing module may further include a sensing module for sensing a motion of a user.

The storage unit 1440 may be defined to include a ROM 1482 or RAM 1481 inside the processor 1480, and a memory card (not illustrated) (for example, micro secure digital (SD) card, memory stick) mounted onto the transmitting apparatus 100.

The sensing portion 1450 may detect a surrounding environment of the transmitting apparatus 100. For example, the sensing portion 1450 may include various types of sensors such as a GPS sensor capable of sensing position information, a motion sensor (e.g., a gyro sensor, an acceleration sensor, or the like) capable of sensing a motion of the electronic apparatus, a pressure sensor, a noise sensor, etc.

The input portion 1460 receives a user command to control the transmitting apparatus 100. For example, the input portion 1460 may include various input circuitry, such as, for example, and without limitation, a touch input, a button, a voice input, a motion input, a keyboard, and a mouse to receive the user command. The input portion 1460 may receive a command for setting a charging priority of the receiving apparatus 200 by a user.

The transducer (Tx) 1470 is configured to generate an ultrasonic signal. According to an example embodiment, in response to an electrical signal being applied to the transducer (Tx) 1470, the transducer (Tx) 1470 may convert the inputted electrical signal to an ultrasonic signal. In response to an ultrasonic signal being transferred from the receiving apparatus 200 to the transducer (Tx) 1470, the transducer (Tx) 1470 may convert an ultrasonic signal to an electrical signal.

The processor 1480 controls the overall operations of the transmitting apparatus 100 by using various programs stored in the storage unit 1440.

The processor 1480 may include a random-access memory (RAM) 281, a read-only memory (ROM) 282, a graphic processor 1483, a main central processing unit (CPU) 1484, the first to the nth interface 1485-1~1485-n, and a bus 1486. The RAM 1481, the ROM 1482, the graphic processor 1483, the main CPU 1484, and the first to the nth interface 1485-1~1485-n may be interconnected through the bus 1486.

The main CPU 1484 accesses the storage unit 1440 and performs booting using the O/S stored in the storage unit 1440. In the ROM 282, command sets for system booting etc. are stored. In addition, the main CPU 1484 performs various operations using various programs stored in the storage unit 1440.

The first to the nth interface (1485-1 to 1485-n) are connected to the above-described various elements. One of the interfaces may be a network interface which is connected with an external device via a network.

In addition, the processor 1480 may be implemented to operate various example embodiments described above in FIGS. 2-13.

Figure 15:
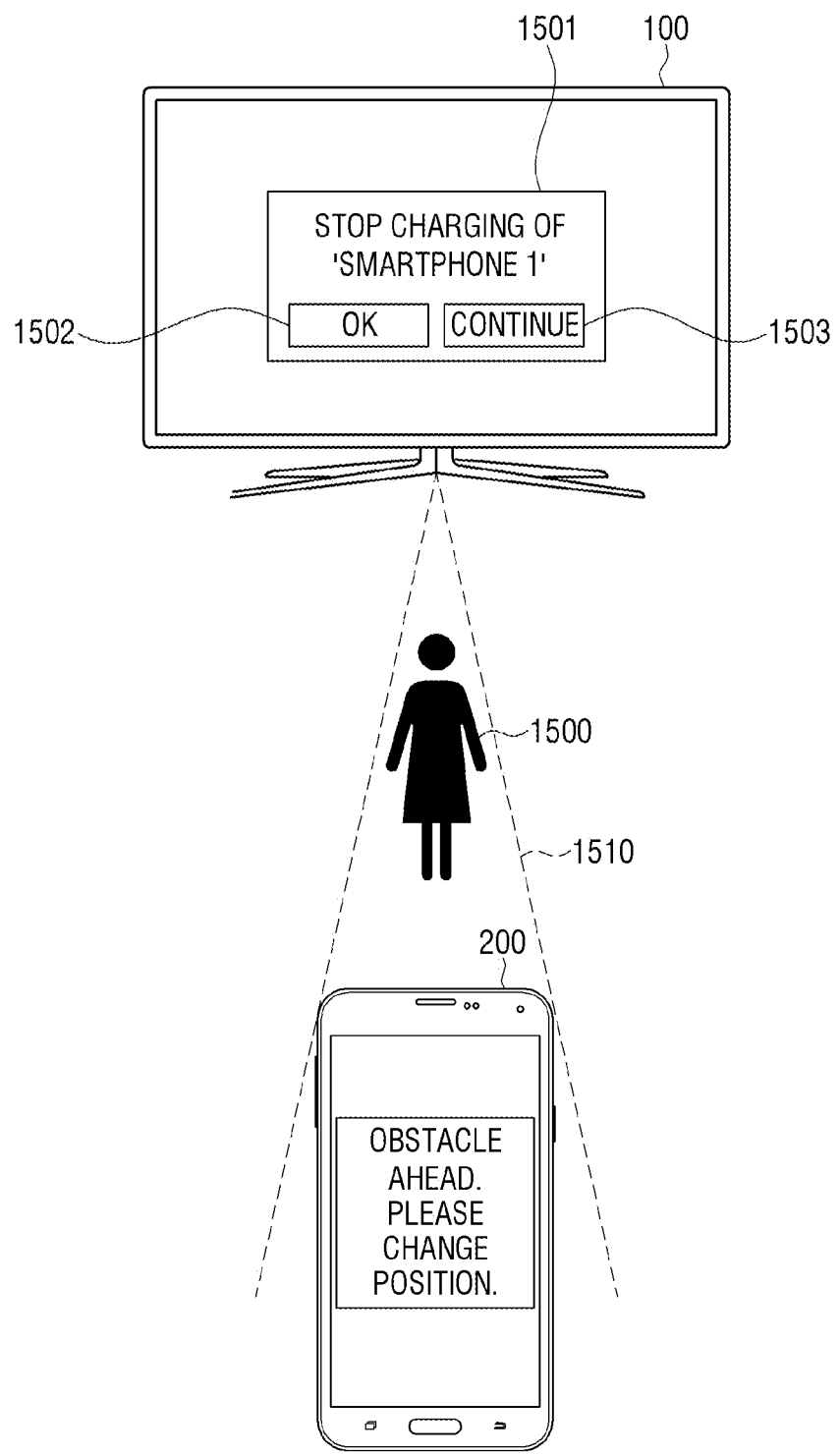
FIGS. 15 and 16 are diagrams illustrating various user interfaces, according to an example embodiment.
Figure 16:
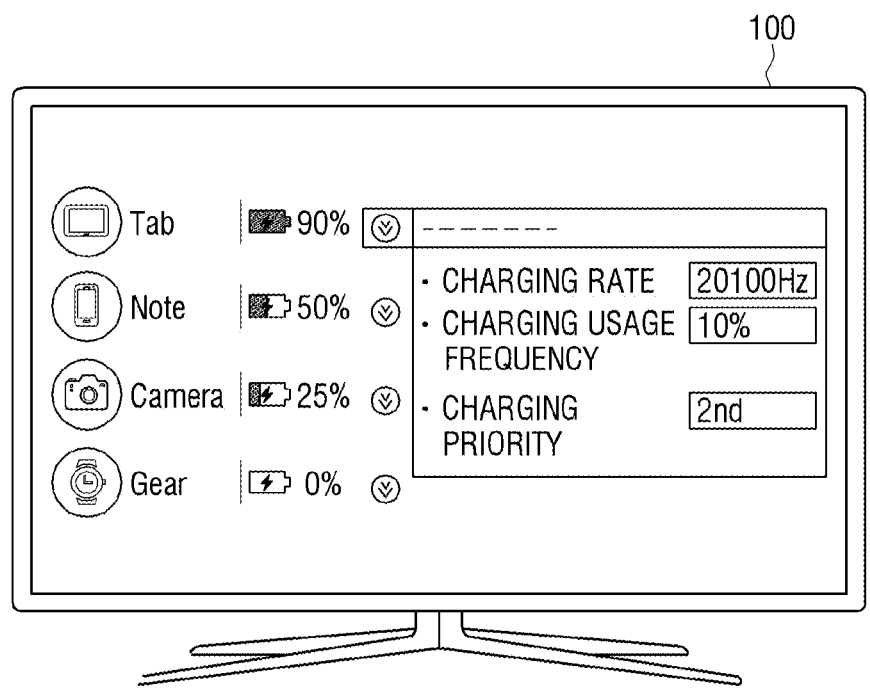

FIGS. 15 and 16 are diagrams illustrating various user interfaces, according to an example embodiment.

FIG. 15 illustrates a user interface in response to an obstacle being present between the transmitting apparatus 100 and the receiving apparatus 200, according to an example embodiment.

In response to determining that an object, which is an obstacle, being present between the transmitting apparatus 100 and the receiving apparatus 200, the transmitting apparatus 100 may not transmit an ultrasonic signal for charging the receiving apparatus 200 on the display. The transmitting apparatus 100 may stop generating an ultrasonic signal for power efficiency of the transmitting apparatus 100.

In response to a backscattered signal being effective on the LOS path transmitting an ultrasonic signal to the receiving apparatus 200, the transmitting apparatus 100 may identify that an object is present on the LOS path.

Referring to FIG. 15, an object 1500 may be present on the LOS 1510 between the transmitting apparatus 100 and the receiving apparatus 200. In this regard, the transmitting apparatus 100 may stop transmitting an ultrasonic signal to the receiving apparatus 200 and stop generating an ultrasonic signal. The transmitting apparatus 100 may display, on the display, a notification message 1501 to notify the user to stop generating and transmitting an ultrasonic signal. The notification message 1501 may include an identification menu 1502 that can be selected to stop charging the transmitting apparatus 100 and a continuation menu 1503 to continue charging.

The transmitting apparatus 100 may transmit a signal related to the receiving apparatus 200 to control the receiving apparatus 200 to provide a user interface indicating that the object 1500 is present on the LOS 1510. Accordingly, the user of the receiving apparatus 200 may change a position of the receiving apparatus 200 through a notification message so that the charging may be continued using the transmitting apparatus 100.

FIG. 16 is a sequence diagram illustrating the operation of a transmitting apparatus, according to an example embodiment.

Referring to FIG. 16, the transmitting apparatus 100 may provide charging information of the receiving apparatuses 200 being charged through the transmitting apparatus 100 in various user interface on a display. For example, the transmitting apparatus 100 may display a charging level and charging rate of each receiving apparatus 200. In addition, the transmitting apparatus 100 may display the charging rate of the receiving apparatuses 200 and charging usage frequency and charging priority of the receiving apparatus 200 identified by the transmitting apparatus 100, and the like. The charging usage frequency may be identified and provided based on the daily/weekly charging usage frequency from among the receiving apparatuses 200 which request charging to the transmitting apparatus 100, but is not limited thereto.

In a case in which the charging usage frequency and charging priority of the receiving apparatus 200 are pre-stored in a memory of the transmitting apparatus 100, in response to the receiving apparatus 200 requesting charging to the transmitting apparatus 100, the transmitting apparatus 100 may automatically perform charging on the basis of the charging usage frequency and the charging priority without going through the authentication stage.

An apparatus (e.g., the transmitting apparatus 100, the receiving apparatus 200 or the wireless power charging system 10) or method (e.g., operations) according to various embodiments may be executed, for example, by at least one computer (e.g., processor) executing instructions included in at least one program of programs maintained in computer-readable storage media.

A program may be included in computer-readable storage media, such as hard disk, floppy disk, magnetic media (e.g., a magnetic tape), optical media (e.g., compact disc read only memory (CD-ROM), digital versatile disc (DVD), magneto-optical media (e.g., floptical disk), hardware device (e.g., a read only memory (ROM), a random access memory (RAM), a flash memory, or the like), or the like.

In this case, a storage medium is generally included as a part of elements of the electronic apparatus but may be installed through a port of the electronic apparatus or may be included in an external device (e.g., cloud, a server, or another electronic device) positioned outside the electronic apparatus. Also, the program may be divided and stored on a plurality of storage media. Here, at least some of the plurality of storage media may be positioned in an external device of the transmitting apparatus 100.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A transmitting apparatus, comprising:
a communication interface;
a plurality of ultrasonic transducer arrays; and
at least one processor configured to:
control the communication interface to perform wireless communication with a plurality of receiving apparatuses,
in response to a charging request being received from each receiving apparatus via the communication interface, transmit an authentication request to each receiving apparatus,
in response to each receiving apparatus accepting the authentication request for the charging request, identify a distance between the transmitting apparatus and each receiving apparatus and a direction in which each receiving apparatus is positioned by using a wireless signal received via the communication interface,
identify a charging priority for each receiving apparatus based on a number of times that each receiving apparatus is charged from the transmitting apparatus over a predetermined time interval,
control the plurality of ultrasonic transducer arrays to generate ultrasonic signals at different frequencies for charging each receiving apparatus, and
control the plurality of ultrasonic transducer arrays to transmit the generated ultrasonic signals to each receiving apparatus based on the direction and the charging priority.

2. The transmitting apparatus as claimed in claim 1, wherein the at least one processor is further configured to identify the charging priority for each receiving apparatus based on charging rate information received from each receiving apparatus via the communication interface.

3. The transmitting apparatus as claimed in claim 1, wherein the at least one processor is further configured to identify the charging priority for each receiving apparatus based on charging state information received from each receiving apparatus via the communication interface.

4. The transmitting apparatus as claimed in claim 1, wherein the at least one processor is further configured to identify the charging priority for each receiving apparatus based on a user setting with respect to each receiving apparatus.

5. The transmitting apparatus as claimed in claim 1, wherein:
the plurality of ultrasonic transducer arrays is arranged at different positions, and
each of the plurality of ultrasonic transducer arrays is configured to generate the ultrasonic signals and each transmit the ultrasonic signals in the direction toward a beam changed by a motor.

6. The transmitting apparatus as claimed in claim 5, wherein the at least one processor is further configured to:
identify at least one of the plurality of ultrasonic transducer arrays that is capable of transmitting a frequency corresponding to each receiving apparatus based on a charging speed of each receiving apparatus, and
control the plurality of ultrasonic transducer arrays to activate the at least one of the plurality of ultrasonic transducer arrays.

7. The transmitting apparatus as claimed in claim 6, wherein the at least one processor is further configured to:
identify a number of the at least one of the plurality of ultrasonic transducer arrays for charging each receiving apparatus, and
control the plurality of ultrasonic transducer arrays to activate the number of the at least one of the plurality of ultrasonic transducer arrays of which a distance to each receiving apparatus is within a predetermined distance from among the number of the at least one of the plurality of ultrasonic transducer arrays.

8. The transmitting apparatus as claimed in claim 6, wherein the at least one processor is further configured to control each of the plurality of ultrasonic transducer arrays to control the motor of each of the plurality of ultrasonic transducer arrays to change a direction of each of the plurality of ultrasonic transducer arrays toward one receiving apparatus.

9. The transmitting apparatus as claimed in claim 7, wherein the at least one processor is further configured to control the plurality of ultrasonic transducer arrays to activate the number of the at least one of the plurality of ultrasonic transducer arrays of which a distance to one receiving apparatus is a shortest distance and that is not assigned to another receiving apparatus toward a direction of the one receiving apparatus.

10. A controlling method for power transmission of a transmitting apparatus, the method comprising:
in response to receiving a charging request from a plurality of receiving apparatuses, transmitting an authentication request to each receiving apparatus;
in response to each receiving apparatus accepting the authentication request for the charging request, identifying a distance between the transmitting apparatus and each receiving apparatus and a direction in which each receiving apparatus is positioned by using a wireless signal;
identifying a charging priority for each receiving apparatus based on a number of times that each receiving apparatus is charged from the transmitting apparatus over a predetermined time;
generating ultrasonic signals at different frequencies for charging each receiving apparatus; and
transmitting the generated ultrasonic signals to each receiving apparatus based on the direction and the charging priority.

11. The controlling method as claimed in claim 10, wherein the identifying comprises identifying the charging priority for each receiving apparatus based on charging rate information received from each receiving apparatus via a communication interface.

12. The controlling method as claimed in claim 10, wherein the identifying comprises identifying the charging priority for each receiving apparatus based on charging state information received from each receiving apparatus.

13. The controlling method as claimed in claim 10, wherein the identifying comprises identifying the charging priority for each receiving apparatus based on a user setting with respect to each receiving apparatus.

14. The controlling method as claimed in claim 10, wherein:
the transmitting comprises transmitting the generated ultrasonic signals to each receiving apparatus by using a plurality of ultrasonic transducer arrays arranged at different positions, and
each of the plurality of ultrasonic transducer arrays generate an ultrasonic signal and each transmit the generated ultrasonic signal in the direction toward a beam changed by a motor.

15. The controlling method as claimed in claim 14, wherein the transmitting further comprises identifying at least one of the plurality of ultrasonic transducer arrays that is capable of transmitting the frequency corresponding to each receiving apparatus based on a charging rate of each receiving apparatus.

16. The controlling method as claimed in claim 15, wherein the identifying further comprises identifying a number of the at least one of the plurality of ultrasonic transducer arrays for charging each receiving apparatus.

17. The controlling method as claimed in claim 15, wherein the transmitting comprises controlling the motor of each of the plurality of ultrasonic transducer arrays to change a direction of each of the plurality of ultrasonic transducer arrays toward one receiving apparatus.

18. The controlling method as claimed in claim 16, wherein the method further comprises:
activating the number of the at least one of the plurality of ultrasonic transducer arrays from among the plurality of ultrasonic transducer arrays that are within a predetermined distance from one receiving apparatus; and
activating the number of the at least one of the plurality of ultrasonic transducer arrays of which a distance to each receiving apparatus is a shortest distance within the predetermined distance and that are not assigned to another receiving apparatus toward a direction of the one receiving apparatus.

* * * * *